Figure 1:
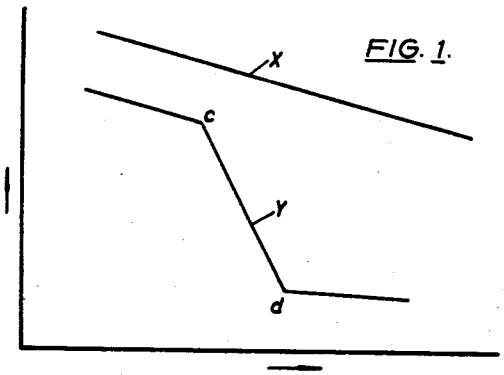

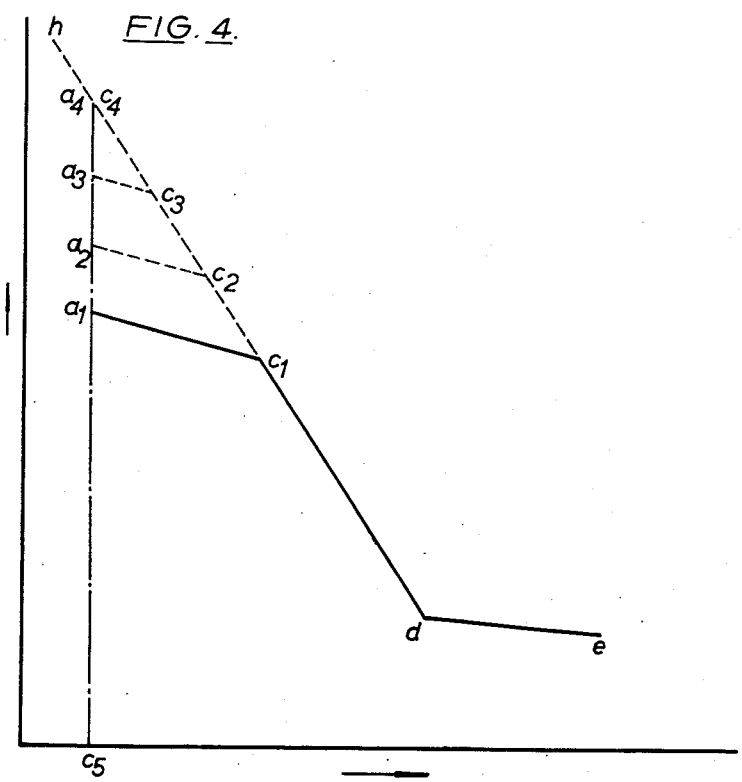

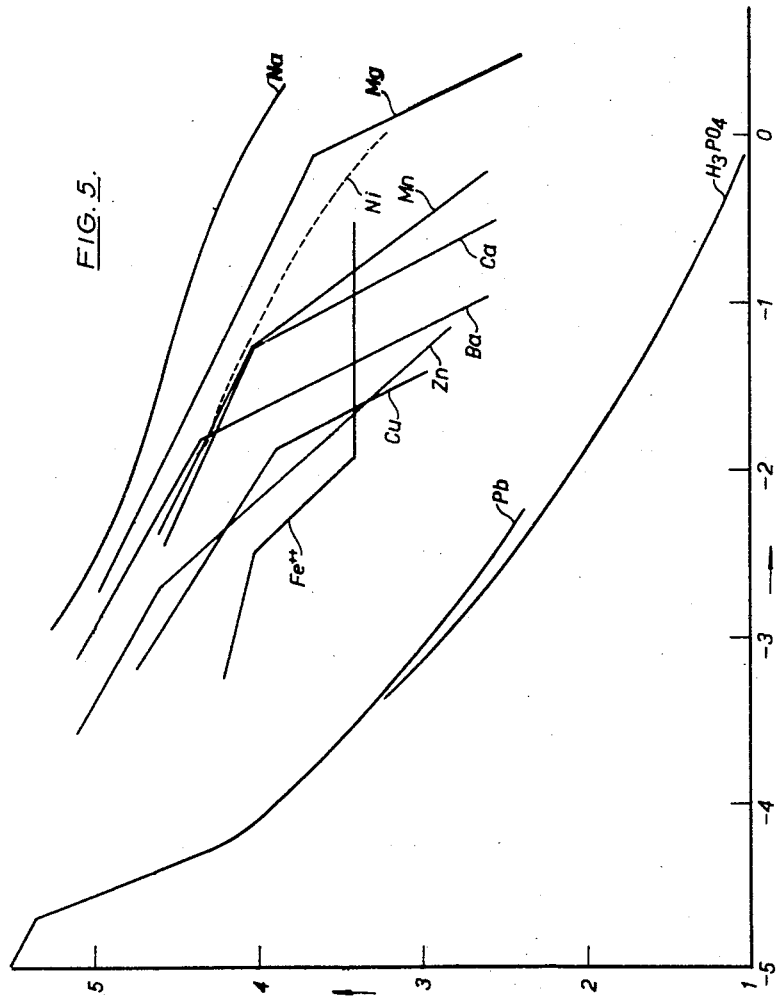

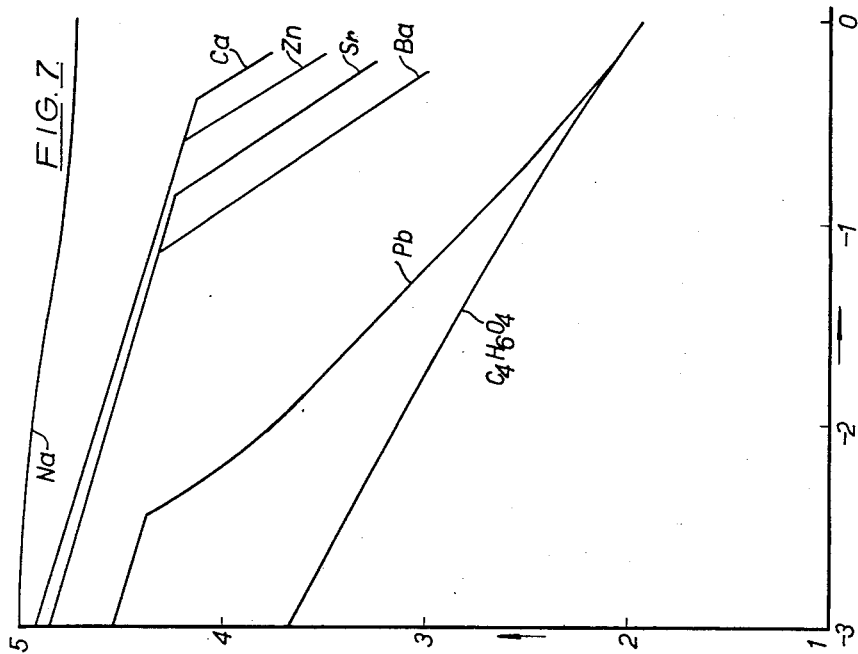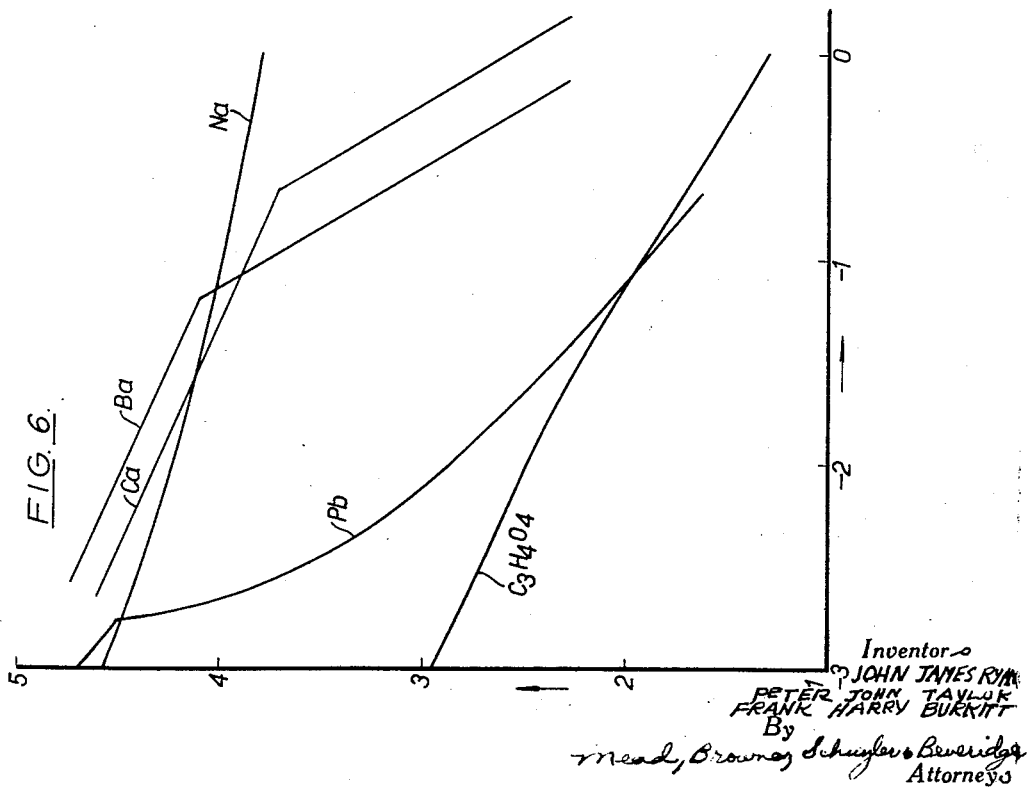

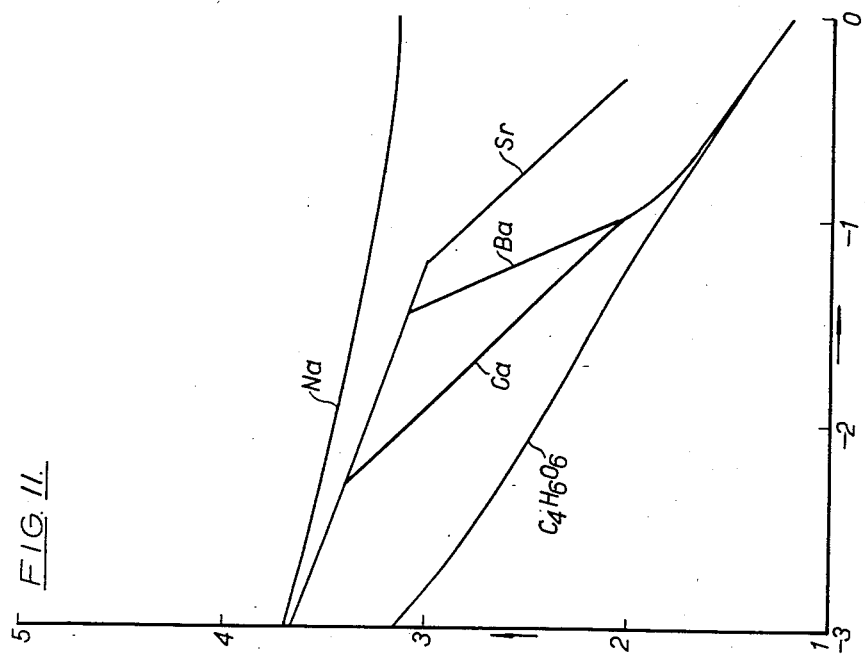
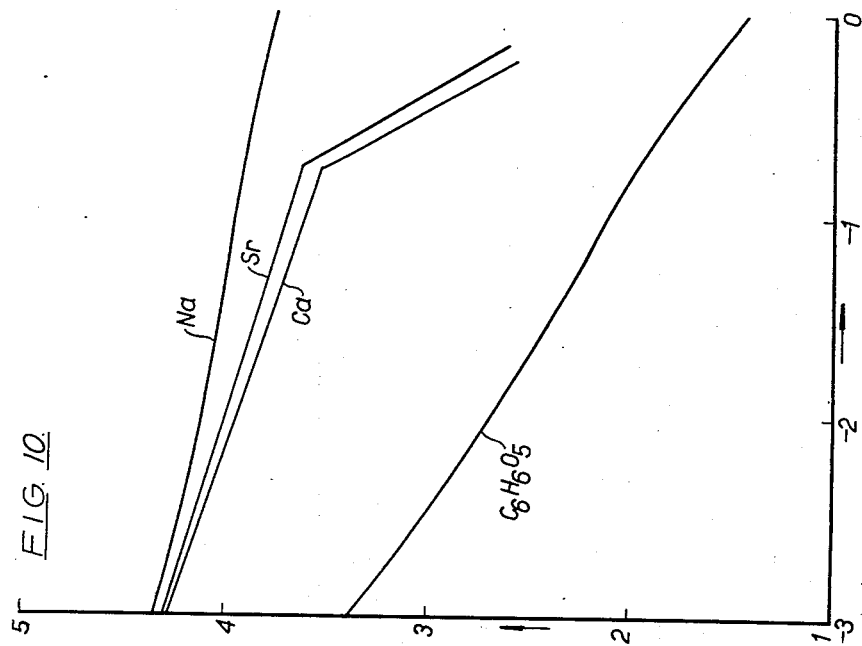

# United States Patent Office 3,006,784
Patented Oct. 31, 1961

3,006,784
FORMATION OF ALDEHYDE CONDENSATION PRODUCTS
John James Ryan and Peter John Taylor, Manchester, England, assignors to Tootal Broadhurst Lee Company Limited, Manchester, England, a British company
Filed Apr. 30, 1956, Ser. No. 581,508
Claims priority, application Great Britain Apr. 29, 1955
16 Claims. (Cl. 117—161)

This invention relates to improvements in the formation of aldehyde condensation products and in the catalysis thereof.

The condensation of many compounds, especially amino compounds, with aldehydes can be catalysed by acids. It is not, however, convenient in many cases to add free acid to solutions containing the ingredients of aldehyde condensation products. For example mixtures of the ingredients of amino-aldehyde condensation products and free acid are unstable and can undergo premature condensation. (The term "ingredients" when used herein includes partial condensates, i.e. the so-called intermediate condensation products.) Such acid catalysts generally have to be added at the last moment before the acid-catalysed condensation is required to take place and such condensation is customarily effected by heating. It is, therefore, more convenient to have a solution of the ingredients of an aldehyde condensation product, especially an amino-aldehyde condensation product, containing a substance which does not catalyse the condensation to any substantial extent at ordinary temperatures but does catalyse it when the solution is heated. Accordingly, in the formation of condensation products from amino compounds and formaldehyde e.g. urea and formaldehyde or melamine and formaldehyde, it is customary to add to an aqueous solution of the resin-forming ingredients, an ammonium salt of a strong acid such as ammonium chloride or an ammonium phosphate. Such a solution has a fairly high pH at ordinary temperatures so that the condensation does not proceed at all or proceeds only slowly, but on heating the pH falls, due to a chemical reaction between the ammonium ion of the ammonium salt of the strong acid and the formaldehyde or the intermediate condensation product causing the strong acid to be liberated, so that the condensation is catalysed and proceeds more rapidly. However, there are certain disadvantages, which will be referred to later, attending the use of ammonium salts because of the chemical reaction referred to above.

One object of the invention is to overcome these disadvantages. Another object is to provide a solution containing the ingredients of an aldehyde condensation product in which the acidity required for the further condensation of said ingredients can be developed without chemical reaction between any of said ingredients and any added substance. Another object is to provide a solution containing the ingredients of an amino aldehyde condensation product in which the acidity required for further condensation of said ingredients can be developed without the presence in said solution of any ammonium salt. Another object is to provide a solution containing the ingredients of an aldehyde condensation product in which the acidity required for further condensation of said ingredients can be developed by mere removal of solvent therefrom. A further object is to provide a solution containing the ingredients of an aldehyde condensation product which, on evaporation, will undergo a sudden and substantial increase in acidity when almost all the solvent has been removed. A still further object is to provide an aqueous solution, particularly useful for treating textile materials, of a crystalloidal intermediate condensation product of urea and formaldehyde or melamine and formaldehyde which is stable at room temperatures but will develop sufficient acidity to catalyse the formation of resin from said condensation product on evaporation and/or heating, especially such a solution containing little or no ammonium salt. These and other advantages can be secured by making use of a little known property of certain acid salts, of which magnesium dihydrogen phosphate is a convenient example. The term "phosphoric acid" is used herein to mean orthophosphoric acid and the term "phosphate" to mean orthophosphate.

When an aqueous solution of sodium dihydrogen phosphate is concentrated by evaporation at room temperature, the salt which first separates out is sodium dihydrogen phosphate. By the term "room temperature" when used herein, we mean substantially 20° C. On the other hand, when an aqueous solution of magnesium dihydrogen phosphate is concentrated by evaporation at room temperature, the salt which first separates out is magnesium monohydrogen phosphate. During the removal of solvent by evaporation, the pH of both these solutions falls; but in the case of the solution of magnesium dihydrogen phosphate, the effect of the separation of magnesium monohydrogen phosphate is that the rate of increase of acidity with increase in the proportion of magnesium in solution becomes greater after the point is reached at which the separation begins.

Moreover, when aqueous solution of magnesium dihydrogen phosphate is merely heated, magnesium monohydrogen phosphate may separate from the solution at about 70° C., this separation being accompanied by a sudden increase in acidity. This appears to be due to the fact that at that temperature a hydrate of magnesium monohydrogen phosphate is formed which is less soluble at that temperature than either magnesium dihydrogen phosphate or the form of magnesium monohydrogen phosphate stable below that temperature. Such hydrate will, accordingly, separate on heating the solution to the above transition temperature even without evaporation of the solution, provided that the initial concentration of the magnesium dihydrogen phosphate is sufficiently high. At concentrations above 10 grams per litre, such separation will take place from simple aqueous solution on mere heating to the above transition temperature.

The first effect can be brought about in any ionizing solvent for the metal dihydrogen phosphate from which a less acid salt first separates out on evaporation. Thus, an ethanol solution of sodium dihydrogen phosphate exhibits the first effect. The second effect can also be brought about in any ionizing solvent capable of forming with magnesium monohydrogen phosphate a complex or crystal form which will separate from the solution on mere heating, as does the hydrate when water is used as the ionizing solvent.

We have found that these effects, or at least the first one, can also be realized with acid salts of polybasic acids, other than magnesium dihydrogen phosphate. Solutions of acid salts from which a less acid salt will separate before such acid salt on removal of solvent and/or on heating can be obtained from polybasic acids other than phosphoric acid, for example phosphorous acid, pyrophosphoric acid, malonic acid, malic acid, maleic acid, tartaric acid and succinic acid.

Examples of acid salts whose solutions can be used are:

Calcium dihydrogen phosphate
Strontium dihydrogen phosphate
Nickel dihydrogen phosphate
Lithium dihydrogen phosphate
Lithium monohydrogen phosphate
Calcium hydrogen phosphite
Magneium dihydrogen pyrophosphate
Calcium hydrogen malonate Strontium hydrogen malonate
Calcium hydrogen malate
Calcium hydrogen maleate
Barium hydrogen maleate
Strontium hydrogen tartrate
Calcium hydrogen succinate It is simply necessary that the acid salt be that of a metal of which a less acid salt with the same polybasic acid is precipitated before said acid salt on mere removal of solvent from and/or on heating of the solution. Such metal will hereinafter be referred to as a "selected metal."

By the term "acid salt" we mean a salt in which less than all of the replaceable hydrogen atoms in the polybasic acid molecule are replaced by the selected metal and the other replaceable hydrogen atom or atoms is or are unreplaced.

By the term "less acid salt" we mean a salt in which more of the replaceable hydrogen atoms in the polybasic acid molecules are replaced by the selected metal than in the case of said acid salt; the term includes salts in which all of the replaceable hydrogen atoms are so replaced.

These effects are reversible. This means that if such solutions, after being concentrated by evaporation (or heated) are again diluted (or cooled as the case may be) the separated salt is re-dissolved and the pH rises again. These effects can be readily demonstrated by the following experiments with magnesium dihydrogen phosphate.

A. *Precipitation and development of acidity by evaporation without heating.*—A quantity of pure crystalline magnesium dihydrogen phosphate dihydrate, $$Mg(H_2PO_4)_2.2H_2O$$

was dissolved in an equal weight of water. After three days standing in the air so that evaporation took place at room temperature, it was found that crystals had deposited. These were filtered off and identified spectroscopically as magnesium monohydrogen phosphate.

A sample of the original solution was diluted ten times with water and was found to have a pH of 3.6. A sample of the filtrate taken after precipitation had occurred and similarly diluted ten times with water was found to have a pH of 3.0.

B. *Precipitation and development of acidity by heating without evaporation.*—A 10% solution of pure crystalline magnesium dihydrogen phosphate dihydrate was made and was found to be stable indefinitely at room temperatures: its pH was 3.6. This solution was then warmed at the rate of 10° C. per hour and at 69° C. a slight powdery precipitate began to separate. On refluxing for 30 minutes this solution deposited a further quantity of crystals which were filtered off and identified spectroscopically as magnesium monohydrogen phosphate. The pH of the filtrate was 2.8.

C. *Precipitation and development of acidity by evaporation and reversal of the effect.*—An N/10 solution of magnesium dihydrogen phosphate was taken and found to be alkaline to bromophenol blue. A quantity of this was evaporated to dryness and water was then added to restore the volume to its original level. The solid did not all re-dissolve but the mixture was now strongly acid to bromophenol blue. On shaking, the mixture became more alkaline, and the solid gradually re-dissolved when the mixture was allowed to stand at room temperature over the course of a few days, the mixture returning to its original colour.

D. *Precipitation and development of acidity by removal of solvent without evaporation.*—To an N/10 solution of magnesium dihydrogen phosphate, ethyl alcohol was added. There was instant precipitation of a solid and the solution became acid to bromophenol blue.

In the present invention, advantage is taken of either or both of these effects, i.e. development of acidity by removal of solvent and by heating, to bring about the acid catalysis of the condensation of amino compounds with aldehyde.

We have found that these effects can be brought about in solutions containing the ingredients of aldehyde condensation products. It thus becomes possible to make solutions, in ionizing solvents such as water or methanol, containing the ingredients of such condensation products, which solutions have a sufficiently high pH to enable them to be kept for long periods without any substantial condensation taking place but which, on removal of solvent and/or on heating, will show a rapid fall in pH after a critical concentration and/or temperature has been reached, thereby enabling the acid-catalysed condensation to take place. In order that such condensation be effectively acid-catalysed, it is necessary that the polybasic acid be one having a first dissociation constant in water of not less than $10^{-6}$.

The critical concentration referred to above is the concentration at which the solution becomes saturated with respect to the less acid salt which separates out before the acid salt. The critical concentration depends upon the nature of the selected metal, upon the nature of the polybasic acid and upon the ionizing solvent employed and may be altered by other ingredients in the solution, especially any common ions. However, it is generally possible to determine the critical concentration for any solution by making pH measurements at various concentrations and at the temperature at which it is desired to use the system and drawing a graph showing the relationship between pH and concentration. The slope of the curve alters suddenly at the point where the less acid salt of the selected metal begins to separate out. Several such graphs are described hereinafter. The word "concentration" refers to the concentration of the selected metal in solution.

The critical temperature, when it exists, is a transition temperature between two phases and is therefore independent of the other ingredients in the solution.

If supersaturation occurs, separation of the less acid salt of the selected metal may not take place immediately the critical concentration and/or temperature is reached. This, however, is no disadvantage for most purposes. The separation of the less acid salt will merely be delayed and when it does take place there will be a sudden fall in pH.

According to the present invention there is provided a solution in an ionizing solvent of the ingredients of an aldehyde condensation product whose formation is catalysed by acid, containing in solution an acid salt of a polybasic acid having a first dissociation constant in water of not less than $10^{-6}$, with a metal of which a less acid salt with the same polybasic acid is precipitated before said acid salt on removal of solvent from and/or on heating of the solution. Preferably the solution contains a dihydrogen phosphate of a metal whose trimetal phosphate or monohydrogen phosphate will separate before its dihydrogen phosphate on removal of solvent and/or on heating of the solution.

A very convenient way of producing such a solution containing the dihydrogen phosphate of such a metal is to introduce into the solution of the ingredients of the amino-aldehyde condensation product the dihydrogen phosphate of a base whose monohydrogen phosphate will separate from solution on removal of solvent and/or on heating before its dihydrogen phosphate, such as an alkali metal or ammonium dihydrogen phosphate, and also a salt of the selected metal, such as magnesium, with an acid which is stronger than phosphoric acid. It is, of course, desirable that neither the salt of the selected metal with such acid stronger than phosphoric acid nor the dihydrogen phosphate of the base should separate first from the solution on removal of solvent and/or on heating, at the temperature to which the solution is subjected. A solution containing an acid salt of a selected metal with a polybasic acid, other than phosphoric acid, having a first dissociation constant in water of not less than $10^{-6}$ can be produced in analogous manner.

Accordingly, the invention includes a solution in an ionizing solvent of the ingredients of an aldehyde resin whose formation is catalysed by acids containing in solution an acid salt, especially an alkali metal or ammonium acid salt, of a polybasic acid having a first dissociation constant in water of not less than $10^{-6}$ (such as the dihydrogen phosphate) and also a salt with an acid stronger than said polybasic acid of a metal of which a less acid salt with said polybasic acid (such as its trimetal phosphate or monohydrogen phosphate) will separate before the acid salt of said metal from the solution on removal of solvent therefrom and/or on heating thereof.

The acid salt may be, for example, a sodium or potassium salt of phosphoric acid. The selected metal for use with salts of phosphoric acid may be, for example, lithium, barium, calcium, strontium, magnesium, zinc, copper, iron (ferrous), manganese, cadmium or cobalt. Ferrous salts are not suitable for use with salts of phosphoric acid if a pH below about 3.5 is required.

The acid stronger than the said polybasic acid may be, for example, hydrochloric acid or sulphuric acid or nitric acid provided that the resulting solution does not unduly attack the ingredients of the aldehyde resin or the material which is to be treated with the solution.

It is preferred to use acid salts of a metal such as an alkali metal, most suitably acid salts of sodium; the acid salts of ammonium are preferably not used since they can give rise to some reaction with the aldehyde or intermediate condensation product in the solution.

A solution as defined above comprises a system of salts which behaves, as regards pH change beyond the critical concentration and/or beyond the critical temperature, as if it were simply a solution of the acid salt of the selected metal. However, the system must be such that the pH at the critical concentration is sufficiently high, or can be made sufficiently high by buffering as hereinafter explained, to prevent premature condensation of the aldehyde resin-forming ingredients.

A few systems which have been found useful are:

(a) Sodium dihydrogen phosphate and magneisum chloride
(b) Sodium dihydrogen phosphate and magnesium sulphate
(c) Sodium dihydrogen phosphate and calcium chloride
(d) Sodium hydrogen malonate and strontium chloride
(e) Sodium hydrogen maleate and barium chloride
(f) Sodium dihydrogen phosphate and lithium chloride
(g) Sodium dihydrogen phosphate and nickel sulphate
(h) Sodium dihydrogen phosphate and strontium chloride
(i) Disodium hydrogen phosphate and lithium chloride
(j) Potassium hydrogen phosphite and calcium chloride
(k) Disodium dihydrogen pyrophosphate and magnesium sulphate
(l) Sodium hydrogen maleate and calcium chloride
(m) Sodium hydrogen malonate and calcium chloride
(n) Sodium hydrogen succinate and calcium chloride
(o) Sodium hydrogen tartrate and strontium chloride
(p) Sodium hydrogen malate and calcium chloride The acid salt of said polybasic acid and the salt of a selected metal with an acid stronger than said polybasic acid are preferably used in substantially equivalent proportions, although an excess of one or the other up to about 3 to 1 equivalents does not give rise to any inconvenience. It is desirable, however, to employ such relative proportions that neither salt will separate from solution before the desired separation of less acid salt takes place, since the salt which so separates serves no useful purpose.

At concentrations below the critical concentration and/or at temperatures below the critical temperature the solutions containing the ingredients of an amino-aldehyde condensation product are quite stable, due to their pH value. By "stable" we mean that the ingredients of the amino-aldehyde resin in the solution will not readily condense to water-insoluble condensation products on standing. Solutions containing the ingredients of urea-formaldehyde resin having a urea to formaldehyde ratio of 1:1.6 and a solids content of 20% weight/volume are stable at 20° C. for a period of not less than about one hour when the pH remains at 4, of not less than about 8 hours when the pH remains at 5, and of not less than about 24 hours when the pH remains at 5.5. It is therefore desirable that the pH value of the solutions should initially be not less than 5. One reason why it is preferable to use an acid salt of a metal such as an alkali metal rather than an acid salt of ammonium, when a salt of an acid stronger than said polybasic acid is also employed, is that the pH of solutions containing salts of metals such as alkali metals remains unchanged on mere standing, whereas the pH of solutions containing ammonium salts falls on mere standing because of the reaction already referred to with the aldehyde or intermediate condensation product which can proceed slowly even without heating; no such reaction takes place when a metal such as an alkali metal salt is employed. It is also desirable to use acid metal salts which are not substantially hydrolysed in solution.

If the initial pH of the solution is too low for it to have whatever stability may be desired, the pH can be raised by buffering. Such buffering is brought about by the addition to the solution of a substance which will increase the concentration of anions of the less acid salt (e.g. monohydrogen phosphate ions) therein, either directly or indirectly. Such direct increase can be brought about by the addition of a soluble salt providing such anions (e.g. a soluble metal monohydrogen phosphate such as an alkali metal monohydrogen phosphate). Indirect increase can be brought about by the addition of a substance which will reduce the hydrogen ion concentration. Examples of such substances are ammonia or organic bases, alkali metal hydroxides and alkali metal salts of acids weaker than said polybasic acid, such as boric acid. Where the polybasic acid is phosphoric acid and the less acid salt of a selected metal which separates is a monohydrogen phosphate, tri-alkali metal phosphates can be used as buffers. There is a limit to the extent to which the initial pH of the solution can be raised by buffering, this limit being determined, for a given concentration of polybasic anion, by the amount of free selected metal ions in solution. The lower the concentration of free selected metal ions, the greater is the amount by which the solution can be buffered. When buffering is effected with a salt of an acid weaker than said polybasic acid, the number of equivalents added must not exceed the number of equivalents of hydrogen ion which can be liberated by precipitation of the less acid salt. This will be further explained hereinafter with the aid of the graphs already referred to.

When the solutions contain the ingredients of an amino-aldehyde condensation product the extent to which the solvent must be removed from the solution by evaporation to initiate the separation of the less acid salt of a selected metal will influence the nature of the amino-aldehyde condensation products which are formed. If, on evaporation of such an aqueous solution of the present invention, separation takes place at such a stage that the pH falls low enough to give rise to water-insoluble condensation products at a time when there is still a substantial proportion of water present, the condensation product will be precipitated in particulate form. If, on the contrary, it is possible by evaporation to remove substantially all of the water before the pH falls low enough to give rise to water-insoluble condensation products, then the resulting products will be resinous in character. Even if some of the condensation product is precipitated from solution in particulate form, there will generally also be an appreciable amount produced in resinous form on further concentration.

The solutions of the present invention may be used for the treatment of fibrous materials such as fibres, yarns, fabrics or paper to produce aldehyde condensation products therein and/or thereon. They may also be used for other purposes for which solutions of thermo-hardening aldehyde resins are commonly employed, for example as adhesives or bonding agents or for the preparation of thermo-hardened resin objects or for the preparation of moulding powders. Thus, they may be used for the bonding of glass fibres, for example to form hard bonded glass mats or soft bonded glass blocks. They may also be used for the bonding of fibres of glass, cotton or the like in thin sheets, for example for the manufacture of the so-called glass fibre tissue. In particular, they are useful for making bonded non-woven viscose rayon fabrics. They may also be used for the production of laminated sheets of paper, wood, leather or the like. They can be used for the impregnation of pulverulent material such as wood flour and the impregnated material can thereafter be moulded by heat and pressure. It is possible to dry wood flour which has been impregnated with the solutions sufficiently to enable it to be ground and used like the conventional moulding powders. When so dried and ground the material seems to retain sufficient solvent to keep the less acid salt in solution. The acidity necessary for further condensation to a thermo-hardened product is developed when the resulting moulding powder is moulded under heat and pressure.

It is known that if an amino-aldehyde condensation product in particulate form is produced in contact with fibres, yarns or fabrics, the particles are deposited thereon and adhere thereto producing an effect known as delustring. It is also known that if a condensation product of resinous character is produced within the fibres then useful effects are produced in textile fabrics so treated or textile fabrics made from the yarns or fibres so treated, these effects being in general improved dimensional stability, improved fastness of many dyestuffs and improved resistance to creasing. It is possible to produce these latter effects in combination with delustring. It is also known that to produce effects which have good wash-fastness, a final heating at a low pH is necessary.

It will be seen, therefore, that the solutions of the present invention in so far as they contain the ingredients of an amino-aldehyde condensation product are particularly suitable for the treatment of textile fibres, yarns or fabrics.

For this purpose, the fibres, yarns or fabrics are impregnated with the solutions of the invention and are then dried and heated. During the drying the solutions are being concentrated by evaporation and a stage is reached at which separation of a less acid salt of a selected metal takes place resulting in an increase in the rate at which the pH falls. If the pH falls to a sufficiently low value to give rise to the precipitation of condensation product from the solutions while they are still in the interstices between the fibres of the textile material, then the condensation product will be deposited in particulate form on the fibres producing delustring. On further drying the solution remaining in the fibres themselves will be further concentrated by evaporation with further lowering of the pH enabling a final heating to be effected at a sufficiently low pH to form resinous condensation product of good fastness to washing. Such resinous condensation product, being formed within the fibres, gives the known useful effects hereinbefore referred to. The formation of the resinous condensation product also increases the fastness to washing of any delustre effect which may have been produced.

Accordingly, the invention includes a process of producing a finish on a textile material which comprises impregnating the textile material with a solution, especially an aqueous solution, of the present invention containing the ingredients of an amino-aldehyde condensation product and thereafter subjecting the impregnated material to drying and heating whereby to effect condensation of the resin-forming ingredients upon or within or upon and within the fibres of the textile material. Thus, the impregnated material may be first dried at a temperature below 100° C. and may thereafter be baked at a temperature above 100° C.

It is preferred to employ, as the ingredients of an amino-aldehyde condensation product, a crystalloidal intermediate condensation product of urea and formaldehyde or melamine and formaldehyde.

When textile yarns or fabrics of cellulosic material are impregnated with aqueous liquors, the fibres themselves will absorb about 25% to 40% of their weight of liquor, depending upon the nature of the fibres. Fibres of viscose rayon or mercerised cotton will absorb about 40% although fibres of unmercerised cotton or linen will absorb only about 25% to 30%. Aqueous liquor taken up by the yarns or fabrics in excess of that absorbed by the fibres will remain in the interstices between the fibres and is referred to herein as interstitial liquor. It is customary, in the treatment of cellulosic yarns or fabrics with aqueous liquors during textile finishing operations, to express the excess of liquor so that the yarns or fabrics retain a known predetermined quantity of liquor, generally 80% or 100% of their dry weight. It follows, therefore, that when yarns or fabrics of cellulosic materials are made to retain about 80–100% of their weight of aqueous liquor, from about one third to about one half of this will be interstitial liquor. It is this interstitial liquor which first disappears on drying. Accordingly, if the retained liquor can be concentrated by evaporation to such an extent that more than about 50% to 75% of the water is removed before any substantial amount of condensation product is precipitated then little or no delustring will take place. If, however, less than this amount of the water must be removed before condensation takes place then delustring will be brought about. Accordingly, in order to produce a delustred effect, the aqueous solution should be so composed that when the impregnated material is dried, the critical concentration (as hereinbefore defined) is exceeded before the weight of solution retained in and on the fibres of the textile material falls below 40% (and preferably before it falls below 60%) by weight based on the weight of dry unimpregnated textile material.

The ingredients of amino-aldehyde condensation products used in the solutions of the present invention may have as their amino component urea or melamine, for example, and as their aldehyde component formaldehyde or paraformaldehyde, for example. As already stated, the term "ingredients" includes partial condensates and we may therefore use in the solutions the water-soluble methylol compounds obtained by the condensation of urea or melamine with formaldehyde under alkaline conditions. We may also use the methylol ethers derived from urea and formaldehyde or melamine and formaldehyde; thus, the dimethyl ether of dimethylol urea may be used. Such methylol ethers do not, however, give particulate precipitates suitable for delustring.

According to a modification of the process of producing a finish on a textile material, the solution is formed on and in the textile material, by effecting the impregnation in two stages. The first stage may comprise impregnating the textile material with a solution containing an acid salt, especially an alkali metal or ammonium acid salt, of said polybasic acid (such as the dihydrogen phosphate), the second stage then comprising impregnating the textile material with a solution containing the salt of a selected metal with an acid stronger than said polybasic acid, the textile material being dried between the stages. Either solution may contain the ingredients of the amino-aldehyde condensation product. Alternatively, the solution used for the first stage may contain the salt of a selected metal with an acid stronger than said polybasic acid and the solution used in the second stage the acid salt, especially an alkali metal or ammonium acid salt, of said polybasic acid (such as the dihydrogen phosphate). As before, either solution may contain the ingredients of the amino-aldehyde condensation product. In any of these alternatives, the composition of the solution used in the second stage must be so chosen that the desired precipitation of less acid salt does not take place upon impregnation but requires removal of solvent from and/or heating of the solution with which the fabric is so impregnated.

It is preferred to employ solutions which do not contain ammonium ions or ions of organic bases. Accordingly, if the solution is made with a metal salt of an acid stronger than said polybasic acid, it is (as already stated) preferred that the acid salt (such as the dihydrogen phosphate) employed be an alkali metal acid salt, especially an acid salt of sodium. Moreover, if the solution is buffered, it is preferred that ammonia or organic bases should not be used for this purpose. It is generally most convenient to employ the ingredients of the amino-aldehyde condensation product in the form of a water-soluble crystalloidal intermediate condensation product produced in known manner under neutral or alkaline conditions. It is preferred to employ such an intermediate condensation product for the preparation of the solutions of the present invention but it is preferred also to use one whose formation has not been catalysed by means of ammonia.

The solutions of the present invention containing the ingredients of amino-aldehyde condensation products possess a number of advantages over the solutions containing such ingredients hitherto employed which solutions depended for the development of acidity upon decomposition of an ammonium salt. Since removal of solvent is required to reduce the pH, (except in a case such as that of magnesium dihydrogen phosphate where separation of a less acid salt will take place merely on heating to a transition temperature) such solutions of the present invention are quite stable even at temperatures above room temperature. Even in the case of magnesium dihydrogen phosphate acidity does not develop below 70° C. if the solution is not evaporated. The development of acidity by reaction of ammonium salts with aldehyde or intermediate condensation product gives rise to the production of volatile bases which are liable to have an unpleasant odour. Such volatile bases are not produced from those solutions of the present invention which do not contain ammonia or an ammonium salt. The use of ammonia and/or ammonium salts in the solutions causes the production of hexamine which adversely affects light-fastness of certain direct dyestuffs. Hexamine is not produced with those solutions of the present invention which do not contain ammonia or an ammonium salt. Solutions in which the development of acidity is caused by the reaction of ammonium salts are dependent for their effect upon the free formaldehyde content of the solutions. The development of acidity in the solutions of the present invention which do not contain ammonium salt is independent of the free formaldehyde content of the solutions. Even those solutions of the present invention which do contain ammonium salt undergo a development of acidity on removal of solvent and/or on heating which is independent of any acidity produced by the reaction of the ammonium salt with free formaldehyde in the solutions. The reaction of the ammonium salt in the known baths is an irreversible decomposition. As already stated the separation of less acid salt from the solutions of the present invention, and hence the change in pH from this cause, is reversible. This means that if such solutions after being concentrated by evaporation (or heated) are again diluted (or cooled, as the case may be) the separated salt is redissolved and the pH rises again. Accordingly, the pH can be reduced as required by removal of solvent from the solutions and can also be increased again by subsequent dilution. The effect of this is that when fibres, yarns or fabrics which have been impregnated with the solutions of the present invention are cured by baking at high temperatures, the acidity is high under the conditions of curing but on standing the moisture which is always absorbed by such materials from the atmosphere dissolves up the salts, giving rise to solution of markedly higher pH.

A further advantage obtained with certain of the catalysts herein described, notably with magnesium dihydrogen phosphate or magnesium sulphate and sodium dihydrogen phosphate, is that the pH value obtained under the conditions of normal stenter drying is not sufficiently low to bring about appreciable resin fixation, which fixation it is desirable to avoid at this stage if the resin is to be insolubilised in the presence of a high proportion of superheated steam or if the impregnated fabric is to be calendered or embossed before resin insolubilisation.

The invention will be further illustrated with reference to the accompanying drawings. In all the figures the pH is plotted as ordinate and the logarithm (to base 10) of the molar concentration as abscissa, FIGS. 1 to 4 are graphs showing idealized curves for the change in pH at room temperature with the logarithm of the molar concentration C of solutions of metal dihydrogen phosphates. FIG. 5 is a graph showing curves obtained at room temperature by experiment for the change in pH with the logarithm of the molar concentration C of aqueous solutions of various metal dihydrogen phosphates. FIGS. 6 to 11 are a set of graphs showing curves obtained at room temperature by experiment for the change in pH with the logarithm of the molar concentration C of aqueous solutions of various metal acid salts.

Referring to FIG. 1 of the drawings, curve X represents in idealized form the change in pH with the logarithm of the molar concentration of a solution of the dihydrogen phosphate of a metal whose dihydrogen phosphate will first separate out on increasing the concentration of the solution by evaporation. The rate of change of pH (shown by the slope of the curve) remains substantially constant over the whole range of concentration until separation of the metal dihydrogen phosphate occurs after which no further change in concentration can take place (since the solution is saturated with the dihydrogen phosphate) and accordingly the pH itself remains constant. Curve Y represents in idealized form the change in pH with the logarithm of the molar concentration of a solution of the dihydrogen phosphate of a metal whose monohydrogen phosphate or trimetal phosphate will first separate out on increasing the concentration of the solution by evaporation, i.e. a "selected metal." It is at once apparent that the rate of change in pH does not remain constant over the whole range of concentrations but is at first at a comparatively low value. This initial rate of change, because it is determined substantially entirely by the rate of increase of hydrogen ion concentration due to removal of solvent, is practically the same as the rate of change represented by curve X. However, curve Y differs from curve X in that the rate of change of pH alters abruptly to a higher value and finally returns to another low value. The concentration $c$ at which this abrupt alteration in the rate of change of pH occurs is that which is termed herein the "critical concentration" and its value will depend on the metal cation of the selected metal dihydrogen phosphate used. The critical concentration will of course vary somewhat with temperature, the extent and direction of such variation again depending on the metal cation of the selected metal dihydrogen phosphate used.

This critical concentration is the point at which the selected metal monohydrogen or trimetal phosphate begins to separate. When this happens hydrogen ions are liberated and the pH of the solution thereafter depends on two factors—firstly on the rate at which hydrogen ions are liberated and secondly on the rate of increase of hydrogen ion concentration due to removal of solvent.

For some time after the separation of the selected metal monohydrogen or trimetal phosphate begins, the major factor determining the rate of change of pH is the rate of liberation of hydrogen ions. As the amount of selected metal ions remaining in solution decreases however, a stage is reached when the liberation of hydrogen ions ceases to be the major factor in determining the rate of change of pH and this rate is determined primarily by the rate of increase of hydrogen ion concentration by removal of solvent. At this stage the rate of change of pH decreases as indicated by the change in slope of the curve at $d$. In practice, of course, this change would not be abrupt as shown but would be more gradual.

Figure 2:
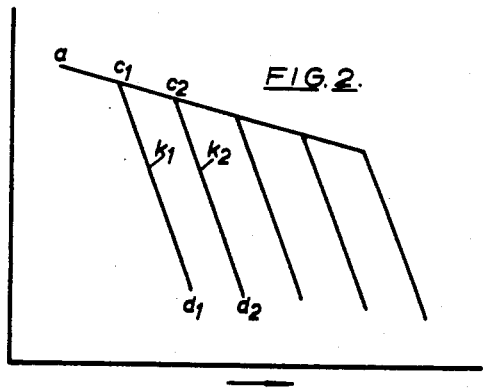

FIG. 2 is an idealized graph illustrating the dependency of the critical concentration on the nature of the selected metal. In this ideal form it is assumed that the pH of the solution at concentrations below the critical concentration is independent of the nature of the selected metal, so that the initial pH indicated by $a$ on the graph will be constant for a given initial concentration. With a given selected metal $k_1$, having a low critical concentration (at $c_1$), increasing the concentration of the solution by evaporation gives a curve which follows the path $a$—$c_1$—$d_1$. If a selected metal $k_2$ whose critical concentration (at $c_2$) is higher is used, the curve follows the path $a$—$c_2$—$d_2$. Since the critical concentration is in fact the point at which the solution becomes saturated with respect to either the monohydrogen or the trimetal phosphate of the selected metal, the point at which the pH begins to fall rapidly is determined by the solubility of either the monohydrogen or trimetal phosphate, of the selected metal. It is to be understood here that the term solubility refers to the solubility under the particular conditions prevailing in the solution and not to the absolute solubility in a pure solvent.

Figure 3:
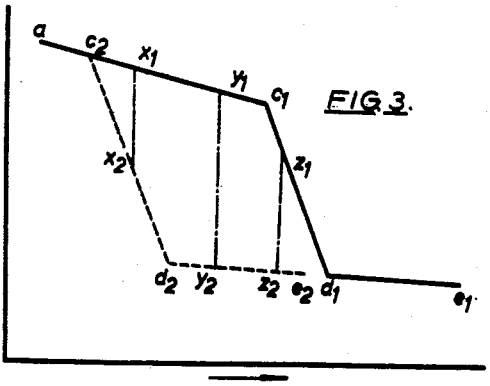

FIG. 3 illustrates the case where the salt which is first precipitated can exist in more than one form (e.g. hydrates) having different solubilities. In the case considered it is assumed that two forms exist, one $f_1$ stable below a temperature $t$ and the other $f_2$ stable above this temperature. It is also asumed that the form stable above $t$ has a lower solubility than the form stable below $t$. Increasing the concentration of the solution by evaporation gives, below $t$, a curve following the path $a$—$c_1$—$d_1$—$e_1$ and above $t$, following the path $a$—$c_2$—$d_2$—$e_2$. In form therefore, the two curves are similar to the graph shown in FIG. 2 the two forms being equivalent to two dihydrogen phosphates of different selected metals. The system considered here, however, is different from that of FIG. 2 in that it is possible to change over from one curve to the other without change of selected metal. Thus, if a solution of $f_1$ is made below $t$ and of a concentration below the critical concentration of $f_2$, e.g. at point $a$ on the graph and the solution is evaporated at a temperature below $t$ until the point $x_1$ is reached, and if then the temperature is quickly raised above $t$, the critical concentration of $f_2$ will be exceeded and $f_2$ will separate until the solid precipitate is in equilibrium with the solution, i.e., at $x_2$ on curve $a$—$c_2$—$d_2$—$e_2$. On further evaporation of the solution keeping the temperature above $t$, the curve will then follow the path $x_2$—$d_2$—$e_2$. The change in the pH, $x_1$ to $x_2$ when $f_2$ separates under such a temperature increase is almost instantaneous and, since it is a phase change, will be independent of other constituents in the solution. The amount by which the pH drops without further evaporation on exceeding the temperature $t$ will depend on the amount by which the concentration of the solution exceeds the critical concentration of $f_2$. Thus, if the evaporation of the solution is continued to the point $y_1$, on curve $a$—$c_1$—$d_1$—$e_1$ before the temperature is caused to exceed $t$, then the pH will fall to a point $y_2$ between $d_2$ and $e_2$ on curve $a$—$c_2$—$d_2$—$e_2$. Since the drop in pH on evaporation of the solution between $d_2$ and $e_2$ is small relative to that which occurs between $c_2$ and $d_2$, or $y_1$ and $y_2$, the effect of increasing the temperature beyond $t$ is to produce almost the maximum possible drop in pH practically instantaneously. If the evaporation of the solution below $t$ is carried on until the point $z_1$ is reached on curve $a$—$c_1$—$d_1$—$e_1$, the critical concentration of $f_1$ will have been exceeded and the rate of change of pH will have already increased. Rapid increase of temperature beyond $t$ will then cause the pH to drop practically instantaneously to a point represented by $z_2$ on curve $a$—$c_2$—$d_2$—$e_2$, which thus has the effect of producing practically instantaneously the pH drop which would normally occur between $z_1$ and $d_1$ on further evaporation of the solution at a temperature below $t$.

It will be apparent that if the separation of $f_2$ upon removal of solvent is delayed by supersaturation, the effect will simply be that line $x_1$—$x_2$ is moved to the right and the almost instantaneous drop in pH, when it occurs, will be all the greater. If separation of the monohydrogen phosphate or trimetal phosphate of the selected metal illustrated in FIG. 2 upon removal of solvent is delayed by supersaturation, then the pH will undergo a sudden drop when separation does take place, undergoing a change similar to that shown by $a$—$x_1$—$x_2$—$d_2$ on FIG. 3.

FIG. 4 illustrates the effect of different degrees of buffering on the change in pH which occurs when the concentration of a solution according to the present invention is increased by evaporation. Referring to the drawing, curve $a_1$—$c_1$—$d$—$e$ represents in idealized form the change in pH obtained on evaporating a solution, not containing a buffer, of the dihydrogen phosphate of a selected metal of initial concentration $c_5$. This curve is similar to that illustrated by curve Y of FIG. 1. If a buffering agent is added in an amount sufficient to raise the initial pH from the point $a_1$ to that at $a_2$ and the solution is then evaporated the curve follows the path $a_2$—$c_2$—$d$—$e$. Again, if the amount of buffering agent added is sufficient to raise the initial pH to the point represented by $a_3$, on evaporating the solution the curve will follow the path $a_3$—$c_3$—$d$—$e$. The critical concentrations (as hereinbefore defined) for these three curves are represented by the points $c_1$, $c_2$, and $c_3$, and it is seen from the graph that $c_3 < c_2 < c_1$. This relation is a characteristic property of the solutions of the present invention, i.e. that the addition of a buffering agent lowers the critical concentration. It is to be noted that these critical concentrations all lie on the extension of line $d$—$c_1$, of curve $a_1$—$c_1$—$d$—$e$. This means that the rate of change of pH with concentration, after the critical concentration has been reached, is unaffected by the buffering. In fact, the rate of change of pH before the critical concentration is reached is also unaffected by the buffering, as is shown by the parallel relation of lines $a_1$—$c_1$, $a_2$—$c_2$ and $a_3$—$c_3$, but this is of no importance. From the above relation it is to be expected that as the amount of buffering agent added is increased and the critical concentration consequently decreased, a stage will be reached when the critical concentration becomes equal to the initial concentration of the solution. Such a stage does, in fact, occur and is represented on the graph by the point $a_4$, $c_4$ which point lies at the intersection of the extension of line $c_5$—$a_1$ and the extension of line $d$—$c_1$. Since at the critical concentration, the solution is saturated with respect to the monohydrogen phosphate of the selected metal, any further addition of buffering agent will cause precipitation of this salt with a consequent lowering in the concentration of the ions of the selected metal and therefore also of dihydrogen phosphate of the selected metal in the solution. The change in pH with addition of buffering agent will then follow the curve $a_4$—$h$.

It is, of course, not desirable that the initial pH be raised beyond the point at which the critical concentration becomes equal to the initial concentration of the solution since this would lead to a loss of ions of the selected metal from the solution. The point $a_4$, $c_4$ thus represents the maximum pH to which it is desirable to buffer the solution. This maximum pH is however easily determinable by finding the point of intersection of the extensions of lines $c_5$—$a_1$ and $d$—$c_1$.

FIG. 5 is a graph showing curves obtained at room temperature by experiment for the change in pH with the logarithm of the molar concentration C of aqueous solution of various metal dihydrogen phosphates. On the graph the curves are indicated by the chemical symbol of the selected metal concerned; thus Mg is the curve for magnesium dihydrogen phosphate [$Mg(H_2PO_4)_2$]. Where a selected metal can have more than one acid dihydrogen phosphate according to its valency state the particular valency state is indicated by positive charges, thus Ferrous is written as $Fe^{++}$. For comparison, the curves for sodium dihydrogen phosphate (indicated by the chemical symbol Na) and for orthophosphate (indicated by the chemical formula $H_3PO_4$) are also shown.

Figure 9:
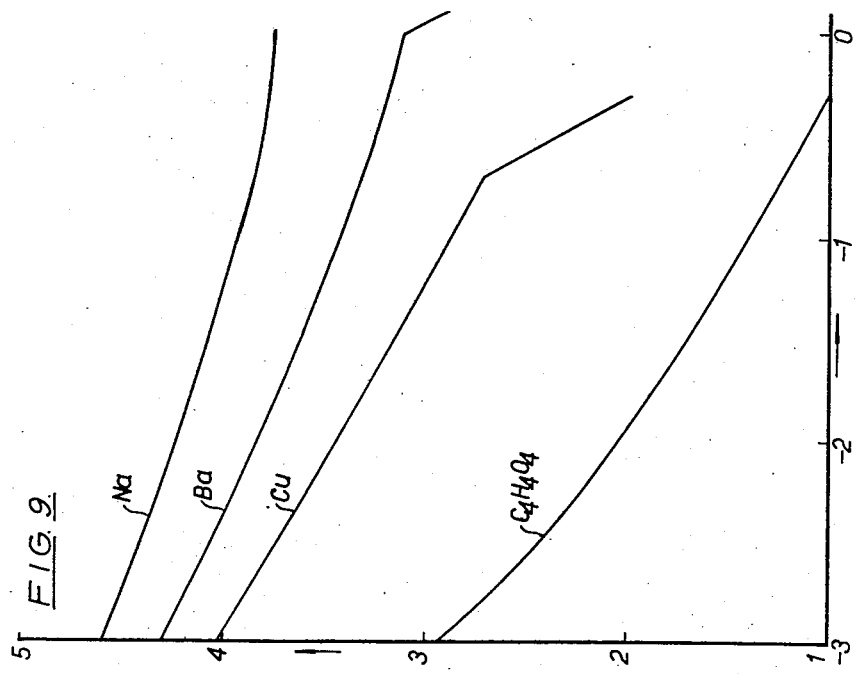
Figure 8:
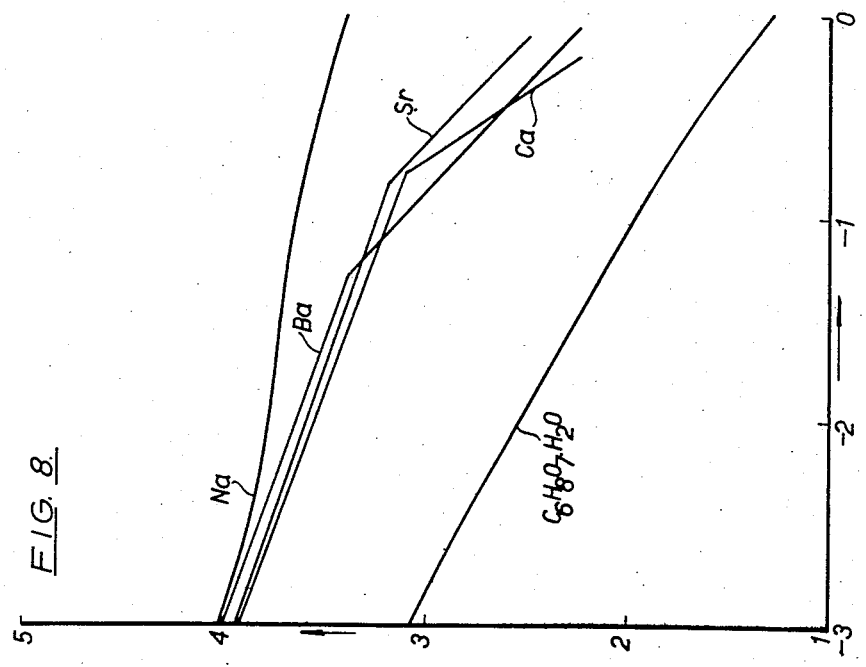

FIGS. 6–11 are graphs similar to that of FIG. 5 showing curves obtained at room temperature by experiment for a change in pH with the logarithm of the molar concentration C of aqueous solutions of various other metal acid salts. The particular systems illustrated are as follows:

FIGURE 6. Hydrogen malonate systems.
FIGURE 7. Hydrogen succinate systems.
FIGURE 8. Di-hydrogen citrate systems.
FIGURE 9. Hydrogen maleate systems.
FIGURE 10. Hydrogen malate systems.
FIGURE 11. Hydrogen tartrate systems.

In each case the curves are indicated by the chemical symbol of the selected metal concerned. For comparison curves for the sodium acid salt and for the free acid are also shown in all the figures. The curves for the sodium salts are indicated in each case by the chemical symbol Na and the curves for the free acid are indicated by the empirical formula for the particular acid concerned, i.e.:

FIGURE 6. $C_3H_4O_4$, Malonic acid.
FIGURE 7. $C_4H_6O_4$, Succinic acid.
FIGURE 8. $C_6H_8O_7H_2O$, Citric acid.
FIGURE 9. $C_4H_4O_4$, Maleic acid.
FIGURE 10. $C_6H_6O_5$, Malic acid.
FIGURE 11. $C_4H_6O_6$, Tartaric acid.

It is known from our British patent specification No. 467,480 that fabrics and other textile materials can be delustred and/or weighted by precipitating thereon an insoluble non-resinous condensation product in the form of finely divided particles from urea or urea-like substances and formaldehyde or from soluble partial condensates thereof used for impregnating the material, by the addition of an acid or a substance liberating an acid before, during or after impregnation so that the precipitate is formed directly on the textile material. The precipitant used in that process is preferably an acid and the textile material may be impregnated with any two of the three components of the reaction and then treated with the third or may be impregnated with any one of the three components and then treated with the other two. Insoluble condensation products of urea and formaldehyde in the form of white, amorphous discrete particles (known as methylene ureas) are excellent delustrants and are capable of being formed by precipitation at ordinary temperature. If heat is used at all in their preparation, it is necessary carefully to avoid either an unduly high temperature or an excessive time of heating, otherwise synthetic resin formation will take place. Although the precipitant is an acid, the urea-formaldehyde mixture may contain a potential precipitant (i.e. one capable of liberating the acid precipitant under the conditions of treatment) e.g. the ammonium salt of an acid, which acid will then be liberated on warming or treating the impregnated material with wet steam, provided that resin-formation is avoided.

Delustring is quite easily accomplished with the aid of aqueous solutions containing the ingredients of amino aldehyde condensation products according to the present invention, by simply impregnating a textile fabric with a solution whose composition is so chosen that the precipitation of condensation product takes place on mere heating or on evaporation before more than a minor proportion of the water has been removed, and then drying the fabric and/or heating it to bring about such precipitation. After such precipitation the dried fabric may be further heated, for example to a temperature above 100° C., to form insoluble resinous condensation products from any remaining resin-forming ingredients.

One advantage of using the solutions of the present invention for delustring textile materials, is that the delustring effect and the quantity of particulate precipitate which is formed can be more easily controlled than in the known process. Another advantage is that it is more easy, with the solutions of the present invention, to combine the delustring with improvement in the properties of the textile materials, such as improved resistance to creasing, consequent upon the formation of resinous condensation product within the fibres.

It has been found that when textile materials are delustred with the solutions of the present invention, some of the salt of the selected metal which was precipitated on removal of solvent from and/or heating of the solution is associated with the condensation product whose particles are deposited on the textile material. If the textile material is treated with a sequestering agent, as may happen in laundering, the selected metal can be removed and this removal may be accompanied by removal of some or all of the particulate condensation product.

This disadvantage can be reduced by using a selected metal which is not removed by sequestering agents likely to be applied to the textile material. Thus calcium salts are less suitable than barium salts since calcium is more effectively sequestered than barium by sodium hexametaphosphate, a compound which is contained in certain commercial detergent preparations. The disadvantage can also be minimised or even avoided by ensuring that the solution contained in the fabric, after deposition of the condensation product in particulate form, still contains resin-forming ingredients and by heating the textile materials after drying to a sufficiently high temperature to form resinous condensation products from such ingredients. By doing this, there may also be conferred upon the fabric the known improvements in properties consequent upon formation of synthetic resin therein, such as improved resistance to creasing.

It is possible to produce delustered patterns on a lustrous background or lustrous patterns on a delustred background by the use of solutions of the present invention. This can be done by printing a fabric with a printing paste containing alkali, for example caustic soda, sodium carbonate or potassium carbonate and the usual other components necessary for successful printing, together with a dyestuff if desired, drying, steaming if any dyestuff is used which requires this, and drying again if necessary, before impregnating with the appropriate solution of the invention. The printed areas resist delustring.

Where the solutions of the present invention containing the ingredients of amino aldehyde condensation products are employed for the treatment of textile materials to deposit resinous condensation product in the fibres thereof, for the production of effects such as resistance to creasing, it is necessary to use solutions from which the less acid salt of the selected metal will not be deposited until a major proportion of the ionizing solvent has been removed. Such solutions are used in the same way as the customary acid-catalysed solutions of the ingredients of an amino-formaldehyde resin. The textile material is impregnated with the solution, dried at a temperature below 100° C. and the dried fabric heated for a short time, say 2 to 6 minutes at a temperature above 100° C., say 120°–180° C. A solution of a crystalloidal condensation product such as is normally used for this type of process may first be prepared and there may then be dissolved in it the necessary salts, such as sodium dihydrogen phosphate and either calcium chloride or magnesium chloride, to make a solution according to the present invention.

The invention will be further illustrated by reference to the following examples in which Examples 1 to 11 illustrate the use of the solutions of the invention for improving the crease-resistance of textile fabrics, Examples 12 to 14 illustrate their use for the delustring of textile fabrics and Examples 15 to 20 illustrate their use for other purposes.

"C.R." is the assessment of crease-resistance obtained by measuring recovery from creasing of a fabric which has been conditioned for a minimum of 24 hours in an atmosphere at 65% relative humidity and at 70° F., on the instrument referred to on page 388 of "Introduction to Textile Finishing" by J. T. Marsh, published by Chapman and Hall in 1948.

"Ringwear" is the assessment of abrasion resistance obtained by using the Ringwear machine described in the Proceedings of the Textile Institute, 1935, volume 26, page 101.

"Tensile Wp." is the assessment of the tensile strength in the warp direction obtained by using a constant rate of traverse fabric tensile testing machine as manufactured by Messrs. Goodbrand & Co. of Stalybridge, Cheshire, England, using fabric strips 1" wide in the weft direction; the application of tension being applied in the warp direction, and the fabric strips having been conditioned for at least 24 hours in an atmosphere of 65% relative humidity at 70° F.

"Rip" is the assessment of ripping strength obtained on a single thread tensile testing machine of suitable range manufactured by Messrs. Goodbrand & Co., of Stalybridge, Cheshire, England, and modified by permanently raising the pawl on the quadrant arm, and providing a buffer to take the impact of the weight attached to the quadrant arm. The test strips used are 12" long by 2" wide and are slit for 4" along the centre line of the fabric, one end of each half width section being attached to each jaw of the machine, and before testing each test strip is conditioned for at least 24 hours in an atmosphere of 65% relative humidity at 70° F.

EXAMPLE 1

*Production of crease resistance on cotton—comparison with known catalyst*

A urea-formaldehyde precondensate was prepared as follows:
2375 cc. neutral aqueous 40% formaldehyde solution,
1000 g. urea, and
100 cc. ammonium hydroxide (s.g. 0.88) were mixed together and allowed to stand overnight.

Three impregnating solutions were prepared by mixing together:

A. 310 cc. of the above precondensate solution, 100 cc. of a molar aqueous solution of magnesium sulphate (approximately 24.6% w./v. solution of $MgSO_4.7H_2O$), 100 cc. of a molar aqueous solution of sodium dihydrogen phosphate (approximately 15.6% w./v. solution of $NaH_2PO_4.2H_2O$). An aqueous solution of 10 g. of a softener such as diethyl-amino-ethyl-alkyl-amino acetate, for example the product sold under the trade name of "Sapamine WP," and water to make up 1000 cc.

B. 310 cc. of the above precondensate solution, 70 cc. of a molar aqueous solution of magnesium chloride (approximately 20.5% w./v. solution of $MgCl_2.6H_2O$), 140 cc. of a molar aqueous solution of sodium dihydrogen phosphate (approximately 15.6% w./v. solution of $NaH_2PO_4.2H_2O$), an aqueous solution of 10 g. of a softener such as that sold under the trade name of "Sapamine WP," and water to make up 1000 cc.

C. 310 cc. of the above precondensate solution, 120 cc. of a 10% solution of ammonium dihydrogen phosphate, $NH_4H_2PO_4$. An aqueous solution of 10 g. of a softener such as that sold under the trade name of "Sapamine WP" and water to make up 1000 cc.

The impregnating bath C was prepared for comparison purposes.

An 80's cotton square cloth was immersed in impregnating bath A, passed through a mangle adjusted to leave 68% (calculated on the dry weight of fabric) of the solution on the fabric, and dried at 60° C. The dried fabric was heated for 3 minutes at 145° C., boiled for 20 minutes in an aqueous solution of 0.25% soap and 0.25% soda ash, rinsed in water, squeezed and dried.

Further pieces of a similar 80's cotton square cloth were immersed in impregnating baths B and C and treated in a manner exactly similar to the above. The figures for cloth tests carried out on the three sets of samples treated in impregnating baths A, B and C are set out in the following table:

| Sample | Resin, Percent | C.R. (warp and weft) | Ringwear | Tensile, w.p. | Rip across Warp | Rip across Weft |
|---|---|---|---|---|---|---|
| A | 8.2 | 6.7 | 1,440 | 34 | 890 | 860 |
| B | 9.1 | 6.7 | 920 | 34 | 820 | 720 |
| C | 8.4 | 6.4 | 1,160 | 36 | 880 | 740 |

The stabilities of the three impregnating baths were assessed by measuring the time taken for opalescence due to the precipitation of methylene ureas to appear. The stability times were as follows:

| | A | B | C |
|---|---|---|---|
| Precipitation time (hours) | 24 | 24 | 5 |

EXAMPLE 2

*Production of crease-resistance on rayon—comparison with known catalyst*

A urea-formaldehyde precondensate was prepared as follows:
1000 cc. neutral aqueous 40% formaldehyde.
500 g. urea, and
45 cc. ammonium hydroxide (s.g. 0.88) were mixed together and allowed to stand overnight.

Three impregnating solutions were prepared by mixing together:

A. 375 cc. of the above precondensate solution, 100 cc. of a molar aqueous solution of magnesium sulphate (approximately 24.6% w./v. solution of $$MgSO_4.7H_2O$$

100 cc. of a molar aqueous solution of sodium dihydrogen phosphate (approximately 15.6% w./v. solution of $NaH_2PO_4.2H_2O$), water to make up 1000 cc.

B. 375 cc. of the above precondensate solution, 100 cc. of a normal aqueous solution of magnesium dihydrogen phosphate (approximately 12.7% w./v. solution of $Mg(H_2PO_4)_2.2H_2O$), water to make up 1000 cc.

C. 375 cc. of the above precondensate solution, 125 cc. of a 10% solution of ammonium dihydrogen phosphate, $NH_4H_2PO_4$, water to make up 1000 cc.

The impregnating bath C was prepared for comparison purposes.

A spun viscose rayon fabric was immersed in impregnating bath A, passed through a mangle adjusted to leave 80% (calculated on the dry weight of fabric) of the solution on the fabric, and dried at 60° C. The dried fabric was heated for 3 minutes at 145° C. washed for 2 minutes in an aqueous solution of 0.25% soap and 0.25% soda ash, rinsed with water, squeezed and dried.

Further pieces of a similar spun viscose rayon fabric were immersed in impregnating baths B and C and treated in a manner exactly similar to the above. The figures for cloth tests carried out on the three sets of samples treated in impregnating baths A, B and C above are set out in the following table:

| Sample | Resin, Percent | C.R. (warp and weft) | Ring wear | Rip across | |
|---|---|---|---|---|---|
| | | | | Warp | Weft |
| A | 13.5 | 6.1 | 290 | 1,270 | 1,400 |
| B | 13.4 | 6.1 | 310 | 1,440 | 1,450 |
| C | 12.7 | 6.1 | 300 | 1,180 | 1,390 |

The resin washfastness of these samples was assessed by comparing the resin content of the unwashed fabrics with samples of these fabrics that had been washed for 30 minutes at 90° C. in an aqueous solution of 0.25% soap and 0.25% soda ash. The wash loss figures expressed as a percentage of the initial solids content on the fabric were as follows:

| | A | B | C |
|---|---|---|---|
| Wash loss, percent | 31 | 27 | 25 |

The bath stability times, assessed as described in Example 1 were as follows:

| | A | B | C |
|---|---|---|---|
| Precipitation time (hours) | 26 | 36 | 8 |

EXAMPLE 3

*Production of crease-resistance—use of ammonia-free impregnating solution*

A urea-formaldehyde precondensate solution was prepared as follows:

1445 cc. neutral aqueous 40% formaldehyde.
720 g. urea, and
20 g. borax were mixed together and allowed to stand overnight. The following morning the precipitated methylol ureas were redissolved by the addition of an equal volume of warm water.

An impregnating solution was prepared by mixing together:

900 cc. of the above precondensate solution.
127.5 cc. of a molar aqueous solution of magnesium sulphate (approximately 24.6% w./v. solution of $MgSO_4.7H_2O$).
127.5 cc. of a molar aqueous solution of sodium dihydrogen phosphate (approximately 15.6% w./v. solution of $NaH_2PO_4.2H_2O$), water to make up 1500 cc.

A spun viscose rayon fabric was immersed in this impregnating bath, passed through a mangle adjusted to leave 100% (calculated on the dry weight of fabric) of the solution on the fabric, and dried at 60° C. The dried fabric was heated for 3 minutes at 140° C., washed in an aqueous solution of 0.25% soap and 0.25% soda ash, rinsed in water, squeezed and dried. The resulting fabric possessed good crease resistance and resin washfastness.

EXAMPLE 4

*Production of crease-resistance—comparison of catalyst systems with components thereof*

A series of impregnating solutions were prepared by mixing together:

A. 30 cc. of a precondensate solution prepared as in Example 2, a solution of 1.78 g. $Mg(H_2PO_4)_2.2H_2O$ in about 30 cc. of water, water to make up 100 cc.

B. 30 cc. of a precondensate solution prepared as in Example 2, 10 cc. of a molar aqueous solution of magnesium sulphate (approximately 24.6% w./v. solution of $MgSO_4.7H_2O$), 10 cc. of a molar aqueous solution of sodium dihydrogen phosphate (approximately 15.6% w./v. solution of $NaH_2PO_4.2H_2O$), water to make up 100 cc.

C. 30 cc. of a precondensate solution prepared as in Example 2, 10 cc. of a molar aqueous solution of magnesium chloride (approximately 20.5% w./v. solution of $MgCl_2.6H_2O$), 10 cc. of a molar aqueous solution of sodium dihydrogen phosphate (approximately 15.6% w./v. solution of $NaH_2PO_4.2H_2O$), water to make up 100 cc.

D. 30 cc. of a precondensate solution prepared as in Example 2, 10 cc. of a molar aqueous solution of magnesium sulphate (approximately 24.6% w./v. solution of $MgSO_4.7H_2O$), water to make up 100 cc.

E. 30 cc. of a precondensate solution prepared as in Example 2, 10 cc. of a molar aqueous solution of magnesium chloride (approximately 20.5% w./v. solution of $MgCl_2.6H_2O$), water to make up 100 cc.

F. 30 cc. of a precondensate solution prepared as in Example 2, 10 cc. of a molar aqueous solution of sodium dihydrogen phosphate (approximately 15.6% w./v. solution of $NaH_2PO_4.2H_2O$), water to make up 100 cc.

The impregnating baths D, E and F above were prepared for comparison purposes in order to demonstrate the relatively poor catalytic efficiency of the separate catalyst components in baths B and C.

A spun viscose rayon fabric was immersed in impregnating bath A, passed through a mangle adjusted to leave 100% (calculated on the dry weight of fabric) of the solution on the fabric and dried at 60° C. The dried fabric was subsequently heated for 3 minutes at 140° C. Further lengths of a similar spun viscose rayon fabric were immersed in baths B, C, D, E, and F, and treated in a similar manner. The resin washfastness figures, measured as described in Example 2 were as follows:

| | A | B | C | D | E | F |
|---|---|---|---|---|---|---|
| Wash Loss, Percent | 25 | 27 | 28 | 81 | 72 | 45 |

EXAMPLE 5

*Production of crease-resistance—use of impregnating solution having pH above 7*

An impregnating solution was prepared by mixing together:

180 cc. of a precondensate prepared as in Example 2.
72 cc. of a molar aqueous solution of lithium chloride (approximately 6% w./v. solution of $LiCl.H_2O$).
24 cc. of a molar aqueous solution of disodium monohydrogen phosphate (approximately 17.8% w./v. solution of $Na_2HPO_4.2H_2O$).
Water to make up 600 cc.

A spun viscose rayon fabric was then immersed in this impregnating solution and treated in the manner described in Example 3, except that curing was carried out for 3 minutes at 160° C. instead of 3 minutes at 140° C. The resultant fabric possessed good crease resistance and good resin washfastness.

The pH of the impregnating solution was 7.9 and it remained stable for many days.

EXAMPLE 6

*Production of crease resistance—use of non-phosphate catalyst system*

An impregnating solution was prepared by mixing together:

30 cc. of a precondensate prepared as in Example 2.
10 cc. of a molar aqueous solution of calcium chloride (approximately 21.9% w./v. solution of $CaCl_2.6H_2O$).
10 cc. of a molar aqueous solution of sodium dihydrogen malonate (approximately 14.4% w./v. solution of $C_3H_3O_4Na.H_2O$).
Water to make up 100 cc.

A spun rayon viscose fabric was then immersed in this impregnating solution and treated in the manner described in Example 3. The resultant fabric possessed good crease resistance and good resin washfastness.

EXAMPLE 7

*Production of crease-resistance—use of non-phosphate catalyst system, and an ammonia-free impregnating solution*

An impregnating solution was prepared by mixing together:

30 cc. of a precondensate prepared as in Example 3.
10 cc. of a molar aqueous solution of calcium chloride (approximately 21.9% w./v. solution of $CaCl_2.6H_2O$).
10 cc. of a molar aqueous solution of sodium hydrogen malate (approximately 17.4% w./v. solution of $C_4H_5O_5Na.H_2O$).
Water to make up 100 cc.

A spun viscose rayon fabric was then immersed in this impregnating solution and treated in the manner described in Example 3. The resultant fabric possessed good crease resistance and good resin washfastness.

EXAMPLE 8

*Production of crease resistance—use of methylol melamine*

75 cc. of 40% w./v. commercial formaldehyde solution were taken and 5 cc. of 4% w./v. aqueous caustic soda was added to make the pH of the resulting mixture 10.2.

42 gms. of melamine were added whilst mechanically stirring the mixture and then 380 cc. of water at a temperature of 50° C. were added, mechanical stirring being continued at such a rate that solid melamine did not settle, and until the melamine had dissolved. The resulting solution which was slightly turbid was adjusted to pH 8.0 by the addition of dilute hydrochloric acid, and then filtered through cloth and the filtrate made up to a total volume of 500 cc. to give a solution containing 14% w./v. of solids.

70 cc. of this solution were taken and 1½ gms. of sodium dihydrogen phosphate ($NaH_2PO_4.2H_2O$) dissolved in 10 cc. of water and 2½ gms. of Epsom salts ($MgSO_4.7H_2O$) dissolved in 10 cc. of water were added and the total volume made up to 100 cc. with water. A spun viscose rayon fabric was immersed in this solution, nipped off through a mangle having a water expression of 115% and dried at a temperature of about 60° C. When dry, the impregnated fabric was heated in an oven for 3 minutes at 145° C. to effect curing. After heating, the fabric was washed for 2 minutes in an aqueous solution of ¼% w./v. soap and ¼% sodium carbonate at a temperature of 80° C. and then in hot and cold water, and then subsequently dried.

The resulting fabric possessed good crease-resistance and contained 8% resin.

EXAMPLE 9

*Production of crease-resistance—use of methylated methylol melamine*

7.5 gms. of a commercial melamine formaldehyde precondensate sold under the name of Aerotex and containing about 80% w./v. of solids were dissolved in 50 cc. of water. To this solution was added 1½ gms. of sodium dihydrogen phosphate ($NaH_2PO_4.2H_2O$) dissolved in 10 cc. of water and 2½ gms. of Epsom salts ($MgSO_4.7H_2O$) dissolved in 10 cc. of water and the resulting mixture made to a total volume of 100 cc. by addition of water.

A spun viscose rayon fabric was impregnated with the above solution, nipped off through a mangle having a water expression of 110% and dried up at a temperature of about 60° C. After drying the fabric was baked for 3 minutes at 160° C. and then washed for 2 minutes in an aqueous solution containing ¼% w./v. of soap and ¼% w./v. of sodium carbonate and then in hot and cold water. After drying the resulting fabric contained 4.5% resin and had good crease-resistance.

EXAMPLE 10

*Production of crease-resistance by successive impregnation with two solutions*

A spun viscose rayon fabric was immersed in a decimolar solution of sodium dihydrogen phosphate (approximately 1.55% w./v. solution of $NaH_2PO_4.2H_2O$), passed through a mangle adjusted to leave 100% (calculated on the dry weight of fabric) of the solution on the fabric, and dried at 60° C.

An impregnating solution was prepared by mixing together:

500 cc. of a precondensate prepared as in Example 2.
100 cc. of a molar aqueous solution of magnesium sulphate (approximately 24.6% w./v. solution of $MgSO_4.7H_2O$).
Water to make up 1000 cc.

The dried fabric was then immersed in this impregnating solution and treated in the manner described in Example 5. The resulting fabric possessed good crease-resistance and resin washfastness.

EXAMPLE 11

*Production of crease-resistance—comparison of impregnating solution containing a buffering agent with an impregnating solution not containing a buffering agent*

Two urea-formaldehyde precondensates were prepared as follows:

A. 200 cc. of neutral aqueous 40% formaldehyde solution, 100 g. urea, 1.7 g. Borax, were mixed together and allowed to stand overnight.
B. 200 cc. of neutral aqueous 40% formaldehyde solution, 100 g. urea, were mixed together and allowed to stand overnight.

Two impregnating solutions were prepared as follows:
I. The following ingredients were mixed together: 300 cc. of Precondensate A, 100 cc. of a normal aqueous solution of magnesium dihydrogen phosphate (12.7% w./v. solution of $Mg(H_2PO_4)_2.2H_2O$), and water to make up 1000 cc.

II. 300 cc. of Precondensate B, 100 cc. of a normal aqueous solution of magnesium dihydrogen phosphate (12.7% w./v. solution of $Mg(H_2PO_4)_2.2H_2O$), and water to make up 1000 cc.

A sample of a spun viscose rayon fabric was immersed in impregnating solution I, passed through a mangle having a water expression of 100% and dried at a temperature of 60° C. When dry, the impregnated fabric was heated in an oven for three minutes at 140° C. to effect curing. After heating, the fabric was washed in an aqueous solution of 0.25% soap and 0.25% soda ash, rinsed, squeezed and dried. The resulting fabric possessed good crease-resistance and resin washfastness.

A further piece of a similar spun viscose rayon fabric was immersed in impregnating solution II and treated in a manner exactly similar to the above. This latter fabric also possessed good crease-resistance and resin washfastness.

The stabilities of the two impregnating solutions assessed as in Example 1 were respectively 40 hours to 1½ hours.

EXAMPLE 12

*Production of delustre by concentration*

A urea formaldehyde precondensate was prepared as follows:

100 gms. urea.
200 cc. of 40% formaldehyde solution.
Neutralized to pH 7.0.

These were mixed together and allowed to stand overnight. The following morning the mixture was gently heated until solution of the methylol ureas which had separated overnight was complete and an equal volume of water added to the solution.

60 cc. of this solution were taken. 15.6 cc. of a 10% aqueous solution of sodium dihydrogen phosphate ($NaH_2PO_4.2H_2O$) and 11.1 cc. of a 10% aqueous solution of calcium chloride, and 13.3 cc. of water were added.

A piece of 10 shaft 5 end satin having a filament viscose rayon warp and a spun viscose rayon weft was padded through the above solution, nipped off through a mangle having a water expression of 110% and dried for 75 minutes at 34° C. in an atmosphere having a relative humidity of 67%.

After drying the fabric was baked for 3 minutes at 140° C. then washed for 5 minutes at 80° C. in a solution of 0.25% of soap and 0.25% soda, and after washing free of soap and soda was dried. The resulting fabric possessed a fairly matt delustred appearance.

A similar piece of fabric impregnated through a solution of 60 cc. of precondensate, 15.6 cc. of 10% solution of sodium dihydrogen phosphate ($NaH_2PO_4.2H_2O$) and 24.4 cc. of water; dried, washed and treated as the above, showed no degree of delustre.

EXAMPLE 13

*Production of delustre by heating*

60 cc. of diluted urea-formaldehyde precondensate solution, prepared as in Example 12 were mixed with 20 cc. of a molar aqueous solution of magnesium sulphate and 20 cc. of a molar aqueous solution of sodium dihydrogen phosphate.

A piece of 10 shaft 5 end satin having a filament viscose rayon warp and a spun viscose rayon weft was padded through this solution and nipped off through a mangle having a water expression of 110%. The nipped-off fabric was passed for 1 minute through an atmosphere of 100% steam at atmospheric pressure. The resulting fabric was dried and then baked for 3 minutes at 140° C. After baking the fabric was washed for 5 minutes in a solution of 0.25% soap and 0.25% soda ash at 80° C. and, after washing free from soap and soda, was dried.

The resulting fabric possessed a good matt delustred appearance.

A similar piece of fabric impregnated through a solution of 60 cc. of precondensate, 20 cc. of molar aqueous solution of sodium dihydrogen phosphate and 20 cc. of water, when steamed and subsequently treated as above, showed no degree of delustre.

EXAMPLE 14

*Production of lustrous prints on delustred ground by single impregnation*

A piece of 10 shaft 5 end satin having a filament viscose rayon warp and spun viscose rayon weft was printed with a printing paste of the following composition:

| | Percent |
|---|---|
| British gum D26 | 20 |
| Trisodium phosphate | 8 |
| Formosul | 2.5 |
| Urea | 5 |
| Glycerol | 3 |
| Colour (Caledon, Jade Green XN200) | 5 |
| Bulk to 100 cc. with water. | |

After drying the fabric was passed through a two-bowl mangle, the lower bowl being wrapped with a woolen fabric and the bottom half of the said bowl being arranged to dip into a trough containing an aqueous solution of 15% magnesium sulphate ($MgSO_4.7H_2O$), 9% sodium dihydrogen phosphate ($NaH_2PO_4.2H_2O$) and 23% solids content of a urea-formaldehyde precondensate, prepared as described in Example 12, the mangle pressure and the amount of woolen fabric wrapping being adjusted so that the mangle transferred to the fabric 86% of water calculated on the dry weight of the fabric when the trough contained water. After passing through the mangle the fabric was immediately steamed for 1 minute at a temperature of 100° C., dried and then heated for 3 minutes at 140° C. The sample was then immersed in 0.2% sodium perborate solution at 20° C. for 20 minutes, washed and immersed in ¾% hydrochloric acid for 15 minutes to ensure complete relustring of the printed areas. The fabric was washed and boiled for 1½ hours in an aqueous solution of ¼% soap, ¼% soda to remove loose colour and loose delustrant and subsequently washed in warm water and dried. After drying the fabric was seen to have lustrous coloured printed areas on a delustred ground, and possessed good crease-resistance on both the delustred and lustrous areas.

EXAMPLE 15

*Production of fireproof board and heat inslating pads*

A urea formaldehyde resin bonding syrup was made by dissolving 120 grams of urea in 280 grams of 40% w./v. commercial formaldehyde solution which had previously been brought to pH 7 with dilute caustic soda solution. After the urea had completely dissolved, 6 cc. of 10% w./v. caustic soda solution was added with stirring and when the addition was completed, 5 cc. of ammonia solution (specific gravity 0.880) was added, stirring being continued until the addition of the ammonia solution was completed. The resulting solution was refluxed for 2 hours and then allowed to cool. When cold, the pH was measured and found to be 7.84. The pH of the solution was then adjusted to 7.4 by the addition of dilute acetic acid (24% w./v.) and then concentrated under reduced pressure until 55 cc. of water had been removed, care being taken to avoid raising the temperature of the solution above 45° C. during the concentration.

The resulting syrup was filtered through a glass wool pad to remove slight traces of suspended solid.

To 45 cc. of the above bonding syrup was added 5 cc. of an 11% w./v. aqueous solution of magnesium dihydrogen phosphate ($Mg(H_2PO_4)_2$) and the resulting mixture which was stirred to ensure uniformity of mixing was used to thoroughly impregnate a loosely packed pad of glass fibres. After impregnation, the pad of glass fibres was sandwiched between two layers of cotton fabric and the sandwich placed in a centrifuge cage 9" diameter and rotated at a rate of 2200 revolutions per minute for 30 seconds, after which time the fibres were only just moistened with syrup. The sandwich was then removed, the cotton fabric layers stripped off the glass fibre pad and the latter dried at 40° C. and then divided into two portions.

The first portion was placed in a heating press and compressed for 10 minutes at 160° C. and at an applied pressure of 150-lbs. per square inch. When the pressure was released the pad was found to be converted into a hard board extremely suitable for fireproof screening purposes.

The second portion was placed on a wire gauge table in a baking oven fitted with a fan to give efficient circulation of the oven atmosphere, and baked for 6 minutes at 140° C. At the end of this period, the pad was removed and found to be a porous, resilient, non-sticky pad from which fibres did not readily become detached, and was in an extremely suitable form for heat insulation purposes; even when immersed in boiling water for 10 minutes it did not disintegrate.

EXAMPLE 16
*Cotton filtration sheeting*

A magnesium dihydrogen phosphate catalysed urea formaldehyde bonding syrup prepared as in Example 15 was used to thoroughly impregnate a loosely packed pad of cotton wool. After impregnation the pad of cotton wool was sandwiched between layers of cotton fabric and centrifuged for 30 seconds in a centrifuge cage of 9″ diameter rotating at 2200 revolutions per minute. After centrifuging the sandwich was removed and the protecting cotton fabric stripped off the cotton wool pad and the pad then dried at 40° C. and then baked for 6 minutes between heated platens, the pressure applied being 12-lbs. per square inch. At the end of this period the pad was removed and found to have been converted into a thin resilient porous sheet very suitable for filtration purposes which did not disintegrate even after 10 minutes immersion in boiling water.

EXAMPLE 17
*Cross laminated paper*

A magnesium dihydrogen phosphate catalysed urea formaldehyde bonding syrup as prepared in Example 15 was used to impregnate sheets of crepe paper towelling. The excess surface liquor was removed by passing through a 13″ domestic type mangle. After nipping the sheets were dried at 40° C. and after drying, 11 sheets were stacked one on top of the other so that the direction of creping on adjacent sheets was at right angles. The resulting stack was cured in a hot press for 45 minutes at a temperature of 150° C. and at a pressure of 150-lbs. per square inch.

After removal from the press it was found that the paper had been converted into a thin board closely resembling wood veneer, which remained substantially unchanged after immersion in boiling water for 30 minutes.

EXAMPLE 18
*Preparation of moulding powder*

A quantity of paper as used in Example 17 was boiled for 1½ hours in N/10 hydrochloric acid solution (0.365% w./v.) to remove bonding material and the resulting mash allowed to stand. The supernatant liquid was decanted and the residual cellulosic mash washed with dilute ammonia until neutral, and then with water to remove all traces of ammonium salts. The cellulose was then dried at 80° C. 55 grams of the dried cellulose was mixed with 45 ccs. of bonding syrup as prepared in Example 15, in which had previously been dissolved 1 gram of Epsom salts ($MgSO_4.7H_2O$) and 1 gram of sodium dihydrogen phosphate ($NaH_2PO_4.2H_2O$). The resulting mixture was thoroughly mixed, dried for 2 hours at 80° C. and then ground to a fine powder. A sample of the resulting moulding powder was placed between silicone greased plates and then heated in a press for 5 minutes at 140° C. at a pressure of 4000-lbs. per inch. On removal from the press the powder was found to be converted into a hard translucent brown sheet which even after immersion for 2 minutes in hot water, followed by pad drying, possessed an electrical resistance of some hundreds of megohms at an electrode separation of less than 1 millimetre.

EXAMPLE 19
*Resin bonded plywood*

A phenol formaldehyde bonding syrup was prepared by dissolving 180 grams of phenol in 150 ccs. of commercial 40% w./v. formaldehyde. When solution of the phenol was complete, 40 ccs. of 40% w./v. caustic soda solution was added and the mixture allowed to stand at room temperature for 16 hours. At the end of this period the resulting syrup was neutralised to pH 7.0 with concentrated hydrochloric acid and then extracted with ether and the ethereal solution evaporated under reduced pressure until no further ether could be removed.

Two 10 cc. samples of the above phenol formaldehyde bonding syrup were taken and to one sample was added 0.5 gram of crystalline magnesium perchlorate and to the other sample was added 0.5 gram of crystalline sodium dihydrogen phosphate. The samples were then shaken and allowed to stand for half an hour. At the end of this period, the sodium dihydrogen phosphate containing sample was decanted to give a clear solution hereinafter termed Solution A. The magnesium perchlorate containing sample was decanted to give a clear solution termed hereinafter Solution B.

Equal volumes of Solutions A and B were mixed and allowed to stand and after several hours showed no signs of depositing any solid precipitate.

Two wood veneers were taken, one painted on one side with Solution A and the other painted on one side with Solution B. The two veneers were then placed one on top of the other with their treated sides in contact and so placed that the wood grains of the two veneers were at right angles to one another. The two pieces were then placed in a heated press and cured for 10 minutes at 180° C. at an applied pressure of 500-lbs. per square inch. At the end of this period the veneers were found to be firmly bonded together, the bond being such that after boiling the veneers for 10 minutes in water, no deterioration of the bond was apparent.

EXAMPLE 20
*Bonded non-woven viscose rayon fibres*

A thin layer of carded viscose rayon staple fibre of weight 3.7 grams per square foot was sandwiched between two layers of cotton fabric and passed through a mangle the bottom bowl of which was wrapped with a woolen material and which dipped in a trough of urea formaldehyde bonding syrup as prepared in Example 15. The woolen wrapping was adjusted so that the weight of syrup transferred to the sandwiched layer of viscose staple was 80% of the dry weight of the viscose. The cotton fabric was then stripped from the viscose and the latter dried at 60° C. When dry, the treated viscose was divided into two parts.

The first part was taken and cured between the paper covered platens of a hot press for 15 minutes at 150° C. and at an applied pressure of 1000-lbs. per square inch. The resultant thin layer of viscose staple was a sticky mass which readily disintegrated on handling.

The second part was taken and sprayed with an 11% w./v. aqueous solution of magnesium dihydrogen phosphate until the viscose layer contained about 8% of its weight of magnesium dihydrogen phosphate solution. The sprayed viscose layer was then dried at 60° C. and then cured between the paper covered platens of a hot press for 15 minutes at 150° C. and at an applied pressure of 1000-lbs. per square inch. The resulting thin layer of viscose was dry paper-like non-sticky material which did not disintegrate after 15 minutes immersion in boiling water.

We claim:
1. A process which comprises impregnating a fibrous material with a solution in an ionizing solvent of the ingredients of an amino-aldehyde resin, whose formation is catalysed by acid, containing in solution a dihydrogen salt of orthophosphoric acid with a metal selected from the group consisting of lithium, barium, calcium, strontium, magnesium, zinc, copper, ferrous iron, manganese, cadmium and cobalt, and thereafter evaporating said solvent from and heating the impregnated material whereby to effect condensation of the resin-forming ingredients.

2. A process which comprises impregnating a fibrous material with a solution in an ionizing solvent of the ingredients of an amino-aldehyde resin, whose formation is catalysed by acid, containing in solution magnesium dihydrogen orthophosphate, and thereafter evaporating said solvent from and heating the impregnated material whereby to effect condensation of the resin-forming ingredients.

3. A process which comprises impregnating a fibrous material with an aqueous solution of the ingredients of an amino-aldehyde resin, whose formation is catalysed by acid, containing in solution an alkali metal acid orthophosphate, and also a salt with an acid stronger than orthophosphoric acid of a metal selected from the group consisting of lithium, barium, calcium, strontium, magnesium, zinc, copper, ferrous iron, manganese, cadmium and cobalt, and thereafter evaporating water from and heating the impregnated material to effect condensation of the resin-forming ingredients.

4. A process for producing a finish on a textile material which comprises impregnating the said textile material with an aqueous solution of the ingredients of an amino-aldehyde resin, whose formation is catalysed by acid, containing in solution a dihydrogen salt of orthophosphoric acid with a metal selected from the group consisting of lithium, barium, calcium, strontium, magnesium, zinc, copper, ferrous iron, manganese, cadmium and cobalt and thereafter evaporating water from and heating the impregnated material, said solution being so composed that, when water is evaporated from said impregnated material, the monohydrogen orthophosphate of said metal is precipitated before the weight of said solution retained in and on the fibres of said textile material falls below 40% by weight, based on the weight of dry unimpregnated textile material, whereby to effect condensation of the resin-forming ingredients upon the fibres of said textile material.

5. A process for producing a finish on a textile material which comprises impregnating said textile material with an aqueous solution of a crystalloidal intermediate condensation product of urea and formaldehyde containing in solution magnesium dihydrogen orthophosphate, evaporating water from and heating the impregnated material, said solution being so composed that, when water is evaporated from said impregnated material, magnesium monohydrogen phosphate is precipitated before the weight of said solution retained in and on the fibres of said textile material falls below 40% by weight, based on the weight of dry unimpregnated textile material, whereby to effect further condensation of said crystalloidal intermediate condensation product upon the fibres of said textile material.

6. A process for producing a finish on a textile material which comprises impregnating the said textile material with an aqueous solution of a crystalloidal intermediate condensation product of melamine and formaldehyde containing in solution magnesium dihydrogen orthophosphate and a smaller molecular proportion of borax, evaporating water from and heating the impregnated material, said solution being so composed that, when water is evaporated from said impregnated material, magnesium monohydrogen phosphate is precipitated before the weight of said solution retained in and on the fibres of said textile material falls below 40% by weight, based on the weight of dry, unimpregnated textile material, whereby to effect further condensation of said crystalloidal intermediate condensation product upon the fibres of said textile material.

7. A process for producing a finish on a textile material which comprises impregnating said textile material with an aqueous solution of the ingredients of an amino-aldehyde resin, whose formation is catalysed by acid, containing in solution on alkali metal acid orthophosphate, and also a salt with an acid stronger than orthophosphoric acid of a metal selected from the group consisting of lithium, barium, calcium, strontium, magnesium, zinc, copper, ferrous iron, manganese, cadmium and cobalt, evaporating water from and heating the impregnated material, said solution being so composed that, when water is evaporated from said impregnated material, the monohydrogen orthophosphate of said metal is precipitated before the weight of said solution retained in and on the fibres of said textile material falls below 40% by weight, based on the weight of dry unimpregnated material, whereby to effect condensation of the resin-forming ingredients upon the fibres of said textile material.

8. A process for producing a finish on a textile material which comprises impregnating said textile material with an aqueous solution of a crystalloidal intermediate condensation product of urea and formaldehyde, containing in solution about equimolecular proportions of sodium dihydrogen orthophosphate and of a magnesium salt of an acid stronger than orthophosphoric acid, thereafter evaporating water from and heating the impregnated material, said solution being so composed that, when water is evaporated from said impregnated material, magnesium monohydrogen phosphate is precipitated before the weight of said solution retained in and on the fibres of said textile material falls below 40% by weight, based on the weight of dry, unimpregnated textile material, whereby to effect further condensation of said crystalloidal intermediate condensation product upon the fibres of said textile material.

9. A process for producing a finish on a textile material which comprises impregnating said textile material with an aqueous solution of a crystalloidal intermediate condensation product of urea and formaldehyde containing in solution about equimolecular proportions of sodium dihydrogen orthophosphate and a magnesium salt of an acid stronger than orthophosphoric acid, and a smaller molecular proportion of borax, and thereafter evaporating water from and heating the impregnated material, said solution being so composed that, when water is so evaporated from said impregnated material, magnesium monohydrogen phosphate is precipitated therefrom only after the weight of said solution retained in and on the fibres of said textile material falls below 40% by weight based on the weight of dry unimpregnated textile material, whereby to effect further condensation of said crystalloidal intermediate condensation product within the fibres of said textile material.

10. A process which comprises successively impregnating a fibrous material with two aqueous liquors, one of said aqueous liquors containing, in solution, at least one alkali metal orthophosphate and the other of said aqueous liquors containing, in solution, a salt with an acid stronger than orthophosphoric acid of a metal selected from the group consisting of lithium, barium, calcium, strontium, magnesium, zinc, copper, ferrous iron, manganese, cadmium and cobalt, at least one of said liquors also containing, in solution, the ingredients of an amino-aldehyde condensation product, the concentration of said dihydrogen salt of said orthophosphoric acid and of said salt with an acid stronger than orthophosphoric acid in the respective liquors being such that the monohydrogen orthophosphate of said metal remains in solution when said fibrous material is impregnated with the second of said aqueous liquors, and thereafter evaporating water from and heating the impregnated material whereby to effect condensation of the resin-forming ingredients.

11. A process which comprises successively impregnating a fibrous material with two aqueous liquors, one of said aqueous liquors containing, in solution, sodium dihydrogen orthophosphate and the other of said aqueous liquors containing in solution magnesium chloride, at least one of said aqueous liquors containing in solution the ingredients of an amino-aldehyde condensation product, the concentration of said sodium dihydrogen phosphate and said magnesium chloride in the respective liquors being such that magnesium monohydrogen phosphate remains in solution when said fibrous material is impregnated with the second of said aqueous liquors, and thereafter evaporating water from and heating the impregnated material whereby to effect condensation of the resin-forming ingredients.

12. A process for producing a finish on a textile material which comprises impregnating said textile material with a first aqueous liquor containing, in solution, an alkali metal orthophosphate, evaporating water from the thus impregnated material, thereafter further impregnating the so-treated material with a second aqueous liquor containing, in solution, a salt with an acid stronger than orthophosphoric acid of a metal selected from the group consisting of lithium, barium, calcium, strontium, magnesium, zinc, copper, ferrous iron, manganese, cadmium and cobalt, at least one of said aqueous liquors containing a crystalloidal intermediate condensation product of urea and formaldehyde, and thereafter evaporating water from and heating the impregnated material, the amount of said alkali metal acid orthophosphate introduced into said textile material by the impregnation with said first aqueous liquor and the concentration of said metal salt with an acid stronger than orthophosphoric acid in said second aqueous liquor being such that when water is evaporated from the impregnated material, the monohydrogen orthophosphate of said metal is precipitated therefrom before the weight of the solution retained in and on the fibres of said textile material falls below 40% by weight, based on the weight of dry unimpregnated material, whereby to effect condensation of the resin-forming ingredients upon the fibres of the said textile material.

13. A process for producing a finish on a textile material which comprises impregnating said textile material with a first aqueous liquor containing, in solution, a salt of an acid stronger than orthophosphoric acid of a metal selected from the group consisting of lithium, barium, calcium, strontium, magnesium, zinc, copper, ferrous iron, manganese, cadmium and cobalt, evaporating water from the thus impregnated material, thereafter further impregnating the so-treated material with a second aqueous liquor containing, in solution, an alkali metal acid orthophosphate, at least one of said aqueous liquors containing the ingredients of an amino-aldehyde resin whose formation is catalysed by acid, and thereafter evaporating water from and heating the impregnated material, the amount of said metal salt with an acid stronger than orthophosphoric acid introduced into the said textile material by the impregnation with said first aqueous liquor, and the concentration of said alkali metal acid orthophosphate in said second aqueous liquor being such that, when water is evaporated from the impregnated material, the monohydrogen phosphate of said metal is precipitated therefrom only after the weight of the solution retained in and on the fibres of said textile material falls below 40% by weight, based on the weight of dry unimpregnated material whereby to effect condensation of the resin-forming ingredients within the fibres of said textile material.

14. A process which comprises impregnating a fibrous material with a solution in an ionizing solvent of the ingredients of an amino-aldehyde resin, whose formation is catalysed by acid, containing in solution a dihydrogen salt of orthophosphoric acid with a metal selected from the group consisting of lithium, barium, calcium, strontium, magnesium, zinc, copper, ferrous iron, manganese, cadmium, and cobalt, and a buffering agent selected from the group consisting of ammonia, organic bases, alkali metal hydroxides, and alkali metal salts of acids weaker than orthophosphoric acid, and thereafter evaporating said solvent from and heating the impregnated material whereby to effect condensation of the resin-forming ingredients.

15. A process for producing a finish on a textile material which comprises impregnating said textile material with an aqueous solution of the ingredients of an amino aldehyde resin, whose formation is catalysed by acid, containing in solution a dihydrogen salt of orthophosphoric acid with a metal selected from the group consisting of lithium, barium, calcium, strontium, magnesium, zinc, copper, ferrous iron, manganese, cadmium and cobalt and a buffering agent selected from the group consisting of ammonia, organic bases, alkali metal hydroxides and alkali metal salts of acids weaker than orthophosphoric acid, evaporating water from and heating the impregnated material, said solution being so composed that, when water is evaporated from said impregnated material, the monohydrogen orthophosphate of said metal is precipitated therefrom before the weight of said solution retained in and on the fibres of said textile material falls below 40% by weight, based on the weight of dry unimpregnated textile material, whereby to effect condensation of the resin-forming ingredients upon the fibres of said textile material.

16. A process for producing a finish on a textile material which comprises impregnating the said textile material with an aqueous solution of the ingredients of an amino-aldehyde resin, whose formation is catalysed by acid, containing in solution an acid salt of orthophosphoric acid selected from the group consisting of the ammonium and alkali metal dihydrogen orthophosphates, and also a salt with an acid stronger than orthophosphoric acid of a metal selected from the group consisting of lithium, barium, calcium, strontium, magnesium, zinc, copper, ferrous iron, manganese, cadmium and cobalt, and a buffering agent selected from the group consisting of ammonia, organic bases, alkali metal hydroxides and alkali metal salts weaker than orthophosphoric acid, thereafter evaporating water from and heating the impregnated material, said solution being so composed that, when water is so evaporated from said impregnated material, the monohydrogen orthophosphate of said metal of said latter group is precipitated therefrom only after the weight of said solution retained in and on the fibres of said textile material falls below 40% by weight based on the weight of dry unimpregnated textile material, whereby to effect condensation of the resin-forming ingredients within the fibres of said textile material.

References Cited in the file of this patent
UNITED STATES PATENTS

| | | |
|---|---|---|
| 2,267,276 | Hager | Dec. 23, 1941 |
| 2,311,027 | Burke | Feb. 6, 1943 |
| 2,348,244 | Dearing | May 9, 1944 |
| 2,442,422 | Loetscher | June 1, 1948 |
| 2,452,200 | Kvalnes et al. | Oct. 26, 1948 |
| 2,582,961 | Burnell et al. | Jan. 22, 1952 |
| 2,635,066 | Meiler et al. | Apr. 14, 1953 |
| 2,646,340 | Nickerson | July 21, 1953 |
| 2,656,327 | Van Wirt et al. | Oct. 20, 1953 |
| 2,662,071 | Elod | Dec. 8, 1953 |
| 2,670,341 | Joffe | Feb. 23, 1954 |
| 2,672,427 | Bauling et al. | Mar. 16, 1954 |
| 2,681,326 | Christianson | June 15, 1954 |
| 2,684,347 | Nickerson | July 20, 1954 |
| 2,819,179 | Barnard et al. | Jan. 7, 1958 |

FOREIGN PATENTS

| | | |
|---|---|---|
| 517,317 | Canada | Oct. 11, 1955 |
| 661,952 | Great Britain | Nov. 28, 1951 |